US009274747B2

(12) United States Patent
Fuller et al.

(10) Patent No.: US 9,274,747 B2
(45) Date of Patent: *Mar. 1, 2016

(54) NATURAL USER INPUT FOR DRIVING INTERACTIVE STORIES

(71) Applicant: MICROSOFT TECHNOLOGY LICENSING, LLC, Redmond, WA (US)

(72) Inventors: Andrew Fuller, Redmond, WA (US); Rudy Poat, Clyde Hill, WA (US); Alex Aben-Athar Kipman, Redmond, WA (US); Kathryn Stone Perez, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 335 days.

This patent is subject to a terminal disclaimer.

(21) Appl. No.: 13/770,483

(22) Filed: Feb. 19, 2013

(65) Prior Publication Data

US 2013/0165225 A1    Jun. 27, 2013

Related U.S. Application Data

(63) Continuation of application No. 12/819,983, filed on Jun. 21, 2010, now Pat. No. 8,381,108.

(51) Int. Cl.
*G06F 17/00* (2006.01)
*G06F 3/16* (2006.01)
(Continued)

(52) U.S. Cl.
CPC ............... *G06F 3/167* (2013.01); *A63F 13/02* (2013.01); *A63F 13/06* (2013.01); *A63F 13/10* (2013.01); *A63F 13/12* (2013.01); *G06F 3/017* (2013.01);
(Continued)

(58) Field of Classification Search
CPC .................................................. G06F 17/30056
See application file for complete search history.

(56) References Cited

U.S. PATENT DOCUMENTS 4,627,620 A    12/1986 Yang
4,630,910 A    12/1986 Ross et al.
(Continued)

FOREIGN PATENT DOCUMENTS

CN    101031866 A    9/2007
CN    101237915 A    8/2008
(Continued)

OTHER PUBLICATIONS

Swartout, W., et al, "Toward the Holodeck: Integrating Graphics, Sound, Character, and Story," USC Institute for Creative Technologies, 2006, pp. 1-9.*

(Continued)

*Primary Examiner* — Laurie Ries
(74) *Attorney, Agent, or Firm* — Gregg Wisdom; Judy Yee; Micky Minhas

(57) ABSTRACT

A system and method are disclosed for combining interactive gaming aspects into a linear story. A user may interact with the linear story via a NUI system to alter the story and the images that are presented to the user. In an example, a user may alter the story by performing a predefined exploration gesture. This gesture brings the user into the 3-D world of the displayed image. In particular, the image displayed on the screen changes to create the impression that a user is stepping into the 3-D virtual world to allow a user to examine virtual objects from different perspectives or to peer around virtual objects.

20 Claims, 15 Drawing Sheets

(51) Int. Cl.
  *A63F 13/98* (2014.01)
  *A63F 13/20* (2014.01)
  *G06F 17/30* (2006.01)
  *G06F 3/01* (2006.01)
  *A63F 13/40* (2014.01)
  *A63F 13/30* (2014.01)
  *G10L 15/26* (2006.01)

(52) U.S. Cl.
  CPC ... *G06F 17/30056* (2013.01); *A63F 2300/1087* (2013.01); *A63F 2300/6045* (2013.01); *A63F 2300/632* (2013.01); *G10L 15/26* (2013.01)

(56) References Cited

U.S. PATENT DOCUMENTS

| | | |
|---|---|---|
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,181,162 A * | 1/1993 | Smith et al. .................. 715/209 |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,274,758 A * | 12/1993 | Beitel et al. .................. 715/203 |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,636,995 A * | 6/1997 | Sharpe et al. .................. 434/317 |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,692,212 A | 11/1997 | Roach |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,751,953 A | 5/1998 | Shiels et al. |
| 5,754,770 A * | 5/1998 | Shiels et al. .................. 715/723 |
| 5,761,662 A * | 6/1998 | Dasan |
| 5,799,304 A * | 8/1998 | Miller |
| 5,873,057 A | 2/1999 | Eves et al. |
| 5,875,108 A | 2/1999 | Hoffberg et al. |
| 5,877,803 A | 3/1999 | Wee et al. |
| 5,892,507 A | 4/1999 | Moorby et al. |
| 5,913,727 A | 6/1999 | Ahdoot |
| 5,933,125 A | 8/1999 | Fernie |
| 5,938,447 A * | 8/1999 | Kirksey .................. 434/169 |
| 5,948,040 A | 9/1999 | DeLorme et al. |
| 5,949,411 A * | 9/1999 | Doerr et al. .................. 715/716 |
| 5,953,485 A * | 9/1999 | Abecassis .................. 386/278 |
| 5,980,256 A | 11/1999 | Carmein |
| 5,989,157 A | 11/1999 | Walton |
| 5,995,649 A | 11/1999 | Marugame |
| 5,999,172 A * | 12/1999 | Roach .................. 715/202 |
| 6,005,548 A | 12/1999 | Latypov et al. |
| 6,009,210 A | 12/1999 | Kang |
| 6,054,991 A | 4/2000 | Crane et al. |
| 6,062,863 A | 5/2000 | Kirksey et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,088,020 A | 7/2000 | Mor |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,190,174 B1 | 2/2001 | Lam |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,243,740 B1 | 6/2001 | Minneman et al. |
| 6,256,033 B1 | 7/2001 | Nguyen |
| 6,256,400 B1 | 7/2001 | Takata et al. |
| 6,278,418 B1 | 8/2001 | Doi |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,342,901 B1 | 1/2002 | Adler et al. |
| 6,363,160 B1 | 3/2002 | Bradski et al. |
| 6,384,819 B1 | 5/2002 | Hunter |
| 6,408,257 B1 | 6/2002 | Harrington et al. |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,512,838 B1 | 1/2003 | Rafii et al. |
| 6,539,931 B2 | 4/2003 | Trajkovic et al. |
| 6,544,040 B1 | 4/2003 | Brelis et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,674,877 B1 | 1/2004 | Jojic et al. |
| 6,681,031 B2 | 1/2004 | Cohen et al. |
| 6,705,868 B1 | 3/2004 | Schleppenbach |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |

(56) References Cited

U.S. PATENT DOCUMENTS

| | | | |
|---|---|---|---|
| 7,042,440 B2 | 5/2006 | Pryor et al. | |
| 7,050,606 B2 | 5/2006 | Paul et al. | |
| 7,058,204 B2 | 6/2006 | Hildreth et al. | |
| 7,060,957 B2 | 6/2006 | Lange et al. | |
| 7,113,918 B1 | 9/2006 | Ahmad et al. | |
| 7,121,946 B2 | 10/2006 | Paul et al. | |
| 7,170,492 B2 | 1/2007 | Bell | |
| 7,184,048 B2 | 2/2007 | Hunter | |
| 7,202,898 B1 | 4/2007 | Braun et al. | |
| 7,222,078 B2 | 5/2007 | Abelow | |
| 7,227,526 B2 | 6/2007 | Hildreth et al. | |
| 7,246,315 B1 | 7/2007 | Andrieu et al. | |
| 7,259,747 B2 | 8/2007 | Bell | |
| 7,308,112 B2 | 12/2007 | Fujimura et al. | |
| 7,317,836 B2 | 1/2008 | Fujimura et al. | |
| 7,333,967 B1 | 2/2008 | Bringsjord et al. | |
| 7,348,963 B2 | 3/2008 | Bell | |
| 7,359,121 B2 | 4/2008 | French et al. | |
| 7,367,887 B2 | 5/2008 | Watabe et al. | |
| 7,379,563 B2 | 5/2008 | Shamaie | |
| 7,379,566 B2 | 5/2008 | Hildreth | |
| 7,389,591 B2 | 6/2008 | Jaiswal et al. | |
| 7,412,077 B2 | 8/2008 | Li et al. | |
| 7,421,093 B2 | 9/2008 | Hildreth et al. | |
| 7,430,312 B2 | 9/2008 | Gu | |
| 7,436,496 B2 | 10/2008 | Kawahito | |
| 7,450,736 B2 | 11/2008 | Yang et al. | |
| 7,452,275 B2 | 11/2008 | Kuraishi | |
| 7,460,690 B2 | 12/2008 | Cohen et al. | |
| 7,489,812 B2 | 2/2009 | Fox et al. | |
| 7,492,367 B2 | 2/2009 | Mahajan et al. | |
| 7,536,032 B2 | 5/2009 | Bell | |
| 7,555,142 B2 | 6/2009 | Hildreth et al. | |
| 7,560,701 B2 | 7/2009 | Oggier et al. | |
| 7,570,805 B2 | 8/2009 | Gu | |
| 7,574,020 B2 | 8/2009 | Shamaie | |
| 7,576,727 B2 | 8/2009 | Bell | |
| 7,590,262 B2 | 9/2009 | Fujimura et al. | |
| 7,593,552 B2 | 9/2009 | Higaki et al. | |
| 7,598,942 B2 | 10/2009 | Underkoffler et al. | |
| 7,607,509 B2 | 10/2009 | Schmiz et al. | |
| 7,620,202 B2 | 11/2009 | Fujimura et al. | |
| 7,627,139 B2 | 12/2009 | Marks et al. | |
| 7,627,536 B2 | 12/2009 | Kacmarcik | |
| 7,668,340 B2 | 2/2010 | Cohen et al. | |
| 7,680,298 B2 | 3/2010 | Roberts et al. | |
| 7,683,954 B2 | 3/2010 | Ichikawa et al. | |
| 7,684,592 B2 | 3/2010 | Paul et al. | |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,809,167 B2 | 10/2010 | Bell | |
| 7,834,846 B1 | 11/2010 | Bell | |
| 7,852,262 B2 | 12/2010 | Namineni et al. | |
| RE42,256 E | 3/2011 | Edwards | |
| 7,896,742 B2 | 3/2011 | Weston et al. | |
| 7,898,522 B2 | 3/2011 | Hildreth et al. | |
| 7,962,430 B1* | 6/2011 | Heidenreich et al. | 706/45 |
| 7,967,731 B2 | 6/2011 | Kil | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 8,089,458 B2 | 1/2012 | Barney et al. | |
| 8,125,487 B2 | 2/2012 | Bakalash et al. | |
| 9,031,382 B1* | 5/2015 | Kaiser et al. | 386/248 |
| 2002/0108109 A1* | 8/2002 | Harris et al. | 725/32 |
| 2003/0192049 A1* | 10/2003 | Schneider et al. | 725/51 |
| 2006/0003824 A1 | 1/2006 | Kobayashi et al. | |
| 2006/0030383 A1 | 2/2006 | Rosenberg et al. | |
| 2006/0075422 A1 | 4/2006 | Choi et al. | |
| 2007/0067536 A1 | 3/2007 | Borgatti et al. | |
| 2007/0087798 A1 | 4/2007 | McGucken | |
| 2007/0248261 A1 | 10/2007 | Zhou et al. | |
| 2007/0254741 A1* | 11/2007 | Lim et al. | 463/42 |
| 2008/0026838 A1 | 1/2008 | Dunstan et al. | |
| 2008/0152191 A1 | 6/2008 | Fujimura et al. | |
| 2008/0252596 A1 | 10/2008 | Bell et al. | |
| 2009/0077504 A1 | 3/2009 | Bell et al. | |
| 2009/0103780 A1 | 4/2009 | Nishihara et al. | |
| 2009/0141933 A1 | 6/2009 | Wagg | |
| 2009/0202114 A1* | 8/2009 | Morin et al. | 382/118 |
| 2009/0215533 A1 | 8/2009 | Zalewski et al. | |
| 2009/0221368 A1 | 9/2009 | Yen et al. | |
| 2010/0041476 A1 | 2/2010 | Eaans et al. | |
| 2010/0093435 A1 | 4/2010 | Glaser et al. | |
| 2010/0161541 A1* | 6/2010 | Covannon et al. | 706/47 |
| 2010/0172556 A1 | 7/2010 | Cohen et al. | |
| 2010/0204211 A1 | 8/2010 | Park et al. | |
| 2010/0293190 A1 | 11/2010 | Kaiser et al. | |
| 2011/0107217 A1 | 5/2011 | Schwarz | |
| 2011/0287823 A1 | 11/2011 | Guinn et al. | |
| 2012/0069131 A1* | 3/2012 | Abelow | 348/14.01 |
| 2012/0190456 A1* | 7/2012 | Rogers | 463/42 |
| 2013/0073389 A1* | 3/2013 | Heath | 705/14.54 |
| 2013/0215115 A1* | 8/2013 | Jenkins | 345/420 |

FOREIGN PATENT DOCUMENTS

| | | | |
|---|---|---|---|
| CN | 101523464 A | 9/2009 | |
| CN | 101254344 B | 6/2010 | |
| CN | 101739120 A | 6/2010 | |
| EP | 0583061 A2 | 2/1994 | |
| JP | 04307585 A | 10/1992 | |
| JP | 08044490 A1 | 2/1996 | |
| JP | 2004537777 A | 12/2004 | |
| TW | 200707257 A | 2/2007 | |
| TW | 200839666 A | 10/2008 | |
| WO | 93/10708 A1 | 6/1993 | |
| WO | 97/17598 A1 | 5/1997 | |
| WO | 99/44698 A1 | 9/1999 | |
| WO | 2006098299 A1 | 9/2006 | |
| WO | 2007020573 | 2/2007 | |
| WO | 2007078639 | 7/2007 | |
| WO | WO2009059065 | 5/2009 | |
| WO | 2009131846 A2 | 10/2009 | |
| WO | 2010006362 A1 | 1/2010 | |

OTHER PUBLICATIONS

Marsella, Stacy C., et al, "Interactive Pedagogical Drama," Proceedings of the 4th International Conference on Autonomous Agents, 2000, pp. 301-308.*

"First Office Action and Search Report Received in Chinese Patent Application No. 201180030439.3", Mailed Date: Feb. 4, 2015, 17 pages.

Qian, et al., "A Gesture-Driven Multimodal Interactive Dance System," 2004 IEEE International Conference on Multimedia and Expo (ICME), 2004, pp. 1579-1582.

Hasegawa, et al., "Human-Scale Haptic Interaction with a Reactive Virtual Human in a Real-Time Physics Simulator," ACM Computers in Entertainment, vol. 4, No. 3, Jul. 2006, pp. 1-12.

Shivappa, et al., "Person Tracking With Audio-visual Cues Using the Iterative Decoding Framework," IEEE 5th International Conference on Advanced Video and Signal Based Surveillance, 2008, pp. 260-267.

Toyama, et al., "Probabilistic Tracking in a Metric Space," Eighth International Conference on Computer Vision, Vancouver, Canada, vol. 2, Jul. 2001, 8 pages.

Mazalek, "Tangible Viewpoints: A Physical Approach to Multimedia Stories", Proceedings of the tenth ACM international conference on Multimedia, Dec. 1-6, 2002, pp. 153-160, ACM, New York, NY, USA.

Schut, "Technology Tells a Tale: Digital Games and Narrative", In Digital Games Research Association (DIGRA), Level Up, Jun. 2003, Utrecht, The Netherlands, http://www.digra.org/dl/db/05150.17157.

Office Action dated Apr. 23, 2012 in U.S. Appl. No. 12/819,983.

(56) References Cited

OTHER PUBLICATIONS

Response to Office Action filed Sep. 11, 2012 in U.S. Appl. No. 12/819,983.
Notice of Allowance and Fee(s) Due dated Oct. 26, 2012 in U.S. Appl. No. 12/819,983.
Mateas, et al. "Facade: An Expirement in Building a Fully-Realized Interactive Drama", Game Developer's Conference: Game Design Track, 2003, pp. 1-24.
Dow, et al. "Ar Facade: An Augmented Reality Interactive Drama", VRST '07: Proceedings of the 2007 ACM Symposium on Virtual Reality Software and Technology, Nov. 2007, pp. 215-216.
Response to Examination Report filed Feb. 11, 2014 in European Patent Application No. 11798610.9.
Supplementary European Search Report dated Sep. 11, 2013 in European Patent Application No. 11798610.9.
Examination Report dated Oct. 30, 2013 in European Patent Application No. 11798610.9.
Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.
Miyagawa et al., "CCD-Based Range Finding Sensor", Oct. 1997, pp. 1648-1652, vol. 44 No. 10, IEEE Transactions on Electron Devices.
Rosenhahn et al., "Automatic Human Model Generation", 2005, pp. 41-48, University of Auckland (CITR), New Zealand.
Aggarwal et al., "Human Motion Analysis: A Review", IEEE Non-rigid and Articulated Motion Workshop, 1997, University of Texas at Austin, Austin, TX.
Shao et al., "An Open System Architecture for a Multimedia and Multimodal User Interface", Aug. 24, 1998, Japanese Society for Rehabilitation of Persons with Disabilities (JSRPD), Japan.
Kohler, "Special Topics of Gesture Recognition Applied in Intelligent Home Environments", In Proceedings of the Gesture Workshop, 1998, pp. 285-296, Germany.
Kohler, "Vision Based Remote Control in Intelligent Home Environments", University of Erlangen-Nuremberg/Germany, 1996, pp. 147-154, Germany.
Kohler, "Technical Details and Ergonomical Aspects of Gesture Recognition applied in Intelligent Home Environments", 1997, Germany.
Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.
Qian et al., "A Gesture-Driven Multimodal Interactive Dance System", Jun. 2004, pp. 1579-1582, IEEE International Conference on Multimedia and Expo (ICME), Taipei, Taiwan.
Zhao, "Dressed Human Modeling, Detection, and Parts Localization", 2001, The Robotics Institute, Carnegie Mellon University, Pittsburgh, PA.
He, "Generation of Human Body Models", Apr. 2005, University of Auckland, New Zealand.
Isard et al., "Condensation—Conditional Density Propagation for Visual Tracking", 1998, pp. 5-28, International Journal of Computer Vision 29(1), Netherlands.
Livingston, "Vision-based Tracking with Dynamic Structured Light for Video See-through Augmented Reality", 1998, University of North Carolina at Chapel Hill, North Carolina, USA.
Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.
Breen et al., "Interactive Occlusion and Collision of Real and Virtual Objects in Augmented Reality", Technical Report ECRC-95-02, 1995, European Computer-Industry Research Center GmbH, Munich, Germany.
Freeman et al., "Television Control by Hand Gestures", Dec. 1994, Mitsubishi Electric Research Laboratories, TR94-24, Caimbridge, MA.
Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.
Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.
Azarbayejani et al., "Visually Controlled Graphics", Jun. 1993, vol. 15, No. 6, IEEE Transactions on Pattern Analysis and Machine Intelligence.
Granieri et al., "Simulating Humans in VR", The British Computer Society, Oct. 1994, Academic Press.
Brogan et al., "Dynamically Simulated Characters in Virtual Environments", Sep./Oct. 1998, pp. 2-13, vol. 18, Issue 5, IEEE Computer Graphics and Applications.
Fisher et al., "Virtual Environment Display System", ACM Workshop on Interactive 3D Graphics, Oct. 1986, Chapel Hill, NC.
"Virtual High Anxiety", Tech Update, Aug. 1995, pp. 22.
Sheridan et al., "Virtual Reality Check", Technology Review, Oct. 1993, pp. 22-28, vol. 96, No. 7.
Stevens, "Flights into Virtual Reality Treating Real World Disorders", The Washington Post, Mar. 27, 1995, Science Psychology, 2 pages.
"Simulation and Training", 1994, Division Incorporated.
English Machine-translation of Japanese Publication No. JP08-044490 published on Feb. 16, 1996.
Response to Office Action filed Jun. 19, 2015, and partial English translation, in Chinese Patent Application No. 201180030439.3.
"First Office Action Issued in Japanese Patent Application No. 2013-516598", Mailed Date: Jul. 27, 2015, 7 pages.
Nakatsu, et al., "Construction of Interactive Movie System II", In Academic Meeting of Information Processing Society, Mar. 1998, pp. 93-100.
"Office Action and Search Report Issued in Taiwan Patent Application No. 100115150", Mailed Date: Oct. 22, 2015, 9 Pages.
"Second Office Action Issued in Chinese Patent Application No. 201180030439.3", Mailed Date: Sep. 28, 2015, 6 Pages.
Response to Office Action filed Oct. 20, 2015 in Chinese Patent Application No. 201180030439.3, and English language Summary of Arguments, 53 pages.
Response to Office Action filed Oct. 26, 2015 in Japanese Patent Application No. 2013-516598, and English language translation of claims as amended, 14 pages.

* cited by examiner

NATURAL USER INPUT FOR DRIVING INTERACTIVE STORIES

CLAIM OF PRIORITY

This application is a continuation of U.S. patent application Ser. No. 12/819,983 filed on Jun. 21, 2010 entitled NATURAL USER INPUT FOR DRIVING INTERACTIVE STORIES, which application is incorporated herein by reference in its entirety.

BACKGROUND

In the past, computing applications such as computer games and multimedia applications used controllers, remotes, keyboards, mice, or the like to allow users to manipulate game characters or other aspects of an application. More recently, computer games and multimedia applications have begun employing cameras and software gesture recognition engines to provide a natural user interface ("NUI"). With NUI, user gestures and speech are detected, interpreted and used to control game characters or other aspects of an application.

At present, NUI systems are widely used for gaming applications. However, NUI systems to date have not been used as a medium for linear story telling. A linear story is a traditional, passive, non-interactive experience, such as for example provided by traditional television programs, movies and books. Linear stories have for decades been widely embraced by the general public. Gaming, especially with NUI systems, is relatively new and has much more limited acceptance to date.

SUMMARY

Disclosed herein are systems and methods for providing an interactive story experience which combines interactive gaming aspects into a linear story. The linear story may be watched by a user, start to finish, without user interaction if desired. Alternatively, a user may interact with the linear story to provide an interactive experience. The user may interact with the linear story via a NUI system, which includes a computing environment, a capture device for capturing user movement data and providing it to the computing device, and an audiovisual device for presenting the story.

In one embodiment, a user may alter the linear story by performing a predefined exploration gesture. This gesture, when detected by the capture device and recognized by the computing environment, brings the user into the 3-D world of the displayed image. In particular, the image displayed on the screen changes to create the impression that a user is stepping into the 3-D virtual world to allow a user to move around within a scene, and to explore and examine virtual objects from different perspectives in the scene, or to peer around virtual objects in the scene.

In one embodiment, the present system relates to a method of combining interactive gaming aspects into a linear story. The method includes the steps of a) presenting the linear story via an audiovisual device using at least one of images and an audio narrative, the linear story having a default set of images and/or narrative that is presented to a user if a user does not interact with the story; b) detecting at least one of a movement and a voice command by a user via a capture device; c) identifying whether the movement and/or the voice command detected in said step b) is an interaction with the linear story that alters the linear story to include a story branch having at least one of additional images and additional narrative not included in the default set of images and/or narrative; and d) altering the linear story by presenting at least one of the additional images and additional narrative to a user via the audiovisual device.

In another embodiment, the present system relates to a computer-readable medium for programming a processor to perform a method of combining interactive gaming aspects into a linear story, including the steps of: a) presenting the linear story via an audiovisual device using at least one of images and an audio narrative, the linear story presented as a complete story, beginning to end and including a default set of images, in the event no interaction by a user is perceived by a capture device monitoring user movements; b) detecting a movement by a user via a capture device associated with the audiovisual device; c) identifying whether the movement detected in said step b) is an interaction with the linear story requiring a modification from the linear story to include a story branch having additional images not included in the default set of images; d) determining whether the additional images may be rendered based on stored or processed data; e) altering the linear story by presenting the additional images to a user via the audiovisual device if it is determined the additional images may be rendered in said step d); and f) scoring a user's interaction where the interaction corresponds to awarding or taking away a predetermined number of points based on the interaction.

In a further embodiment, the present system relates to a system for combining interactive gaming aspects into a linear story. The system includes an audiovisual device for presenting at least one of images and an audio narration; an image capture device for capturing at least one of image and audio data from a user; and a computing environment coupled to the audiovisual device and image capture device. The computing environment operates to a) present the linear story via the audiovisual device using at least one of images and an audio narrative, the linear story presented as a complete story, beginning to end and including a default set of images, in the event no interaction by a user is perceived by the capture device; b) detect a movement by a user via the capture device; c) identify whether the detected movement is an exploration gesture; d) branch from the linear story to a story branch upon identifying the movement as an exploration gesture. The branching includes the operations of d1) sensing a point on the audiovisual device indicated by the user, d2) calculating a 3-D real world vector from a portion of the user to the point on the audiovisual device indicated by the user, d3) translating the 3-D real world vector to a 3-D machine space vector having a start point at the current view perspective and an end point at the virtual object in 3-D machine space, and d4) displaying the virtual object from a viewing perspective at the end point of the 3-D machine space vector.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DETAILED DESCRIPTION

Embodiments of the present technology will now be described with reference to FIGS. 1A-14, which in general relate to a system and method for providing an interactive story experience which combines interactive gaming aspects into a linear story. A NUI system is provided for running an interactive story application. If run without user interaction, the story application provides a linear story to a user start to finish. Alternatively, a user may interact with the story application via the NUI system to perform a variety of actions.

In one embodiment, a user may alter the linear story by performing a predefined exploration gesture. This gesture signals to the system that the user desires to step into and explore the three-dimensional (3-D) virtual world displayed to the user. Depending on the exploration gesture performed, the displayed image changes to create the impression that a user is entering into the 3-D virtual world to allow a user to move around within a scene, and to explore and examine virtual objects from different perspectives in the scene. A user may also peer behind virtual objects in the scene to see the back side of these virtual objects or to examine more closely other objects obscured by the foreground objects.

While exploring within the 3-D virtual world, or by performing other gestures or movements, a user may alter the plot of the linear story. In such embodiments, the story application may branch to other subplots and possibly other story outcomes.

Figure 1A:
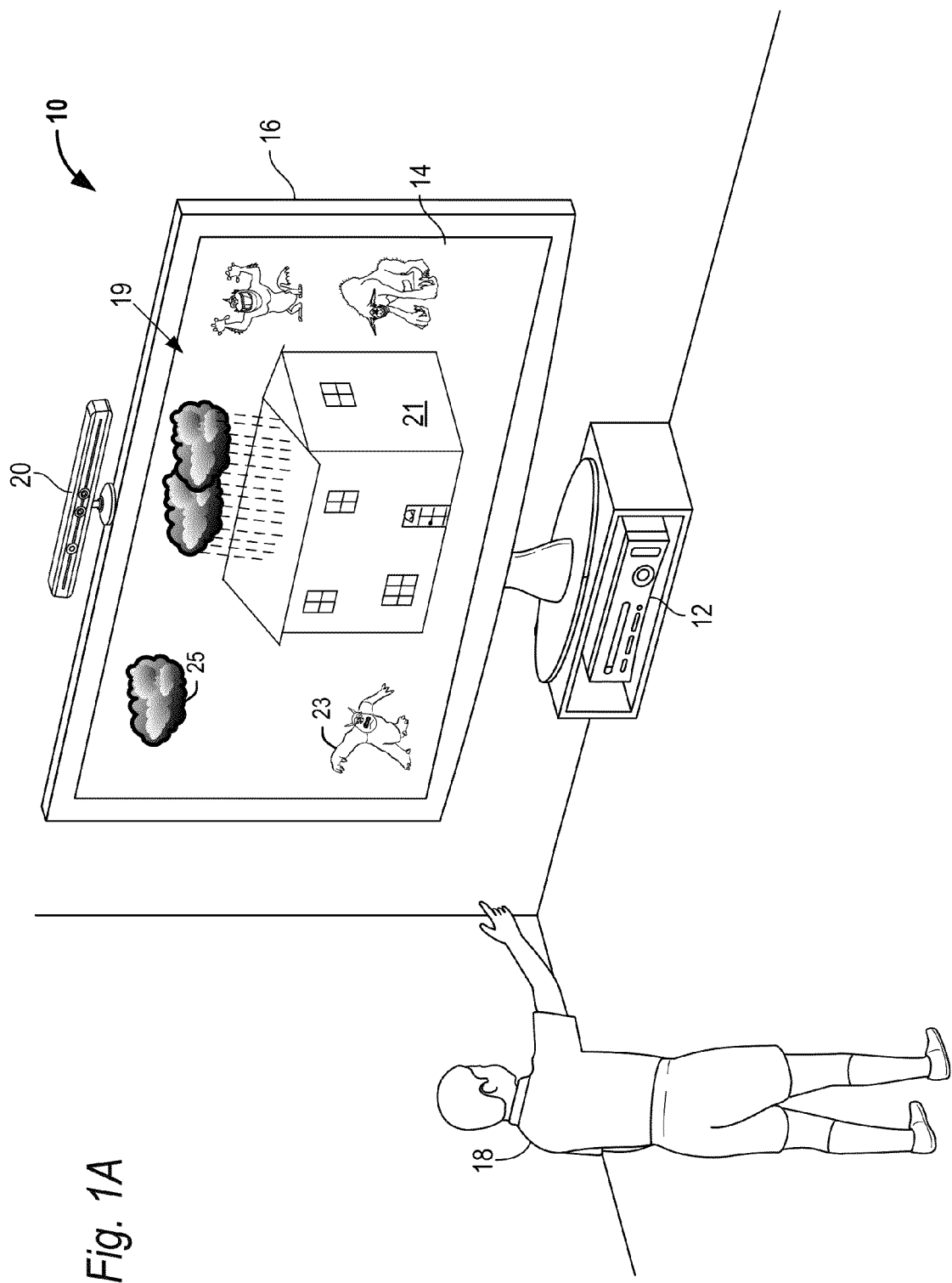
FIG. 1A illustrates an example embodiment of a target recognition, analysis, and tracking system for providing an interactive story experience.
Figure 1B:
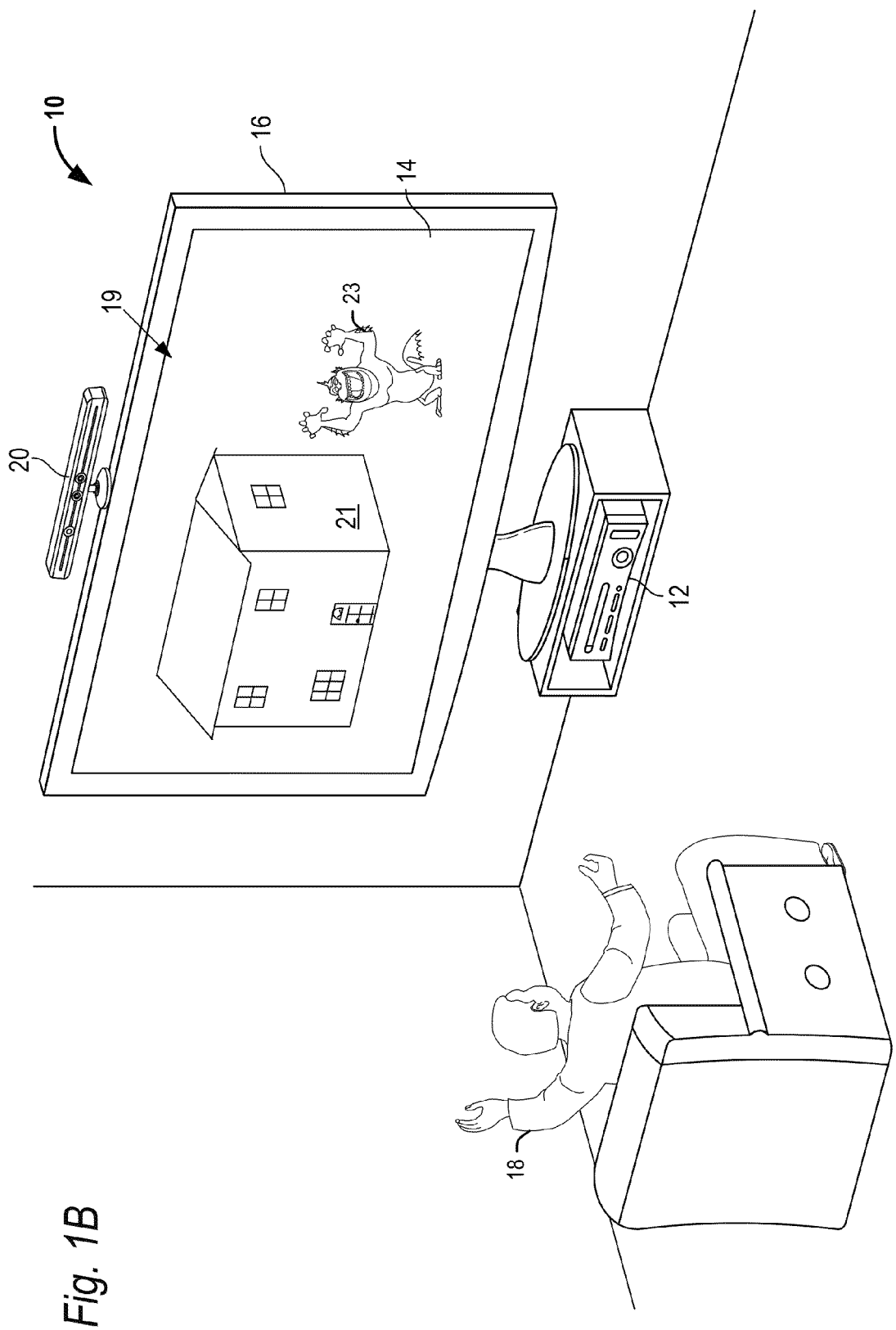
FIG. 1B illustrates a further example embodiment of a target recognition, analysis, and tracking system for providing an interactive story experience.
Figure 2:
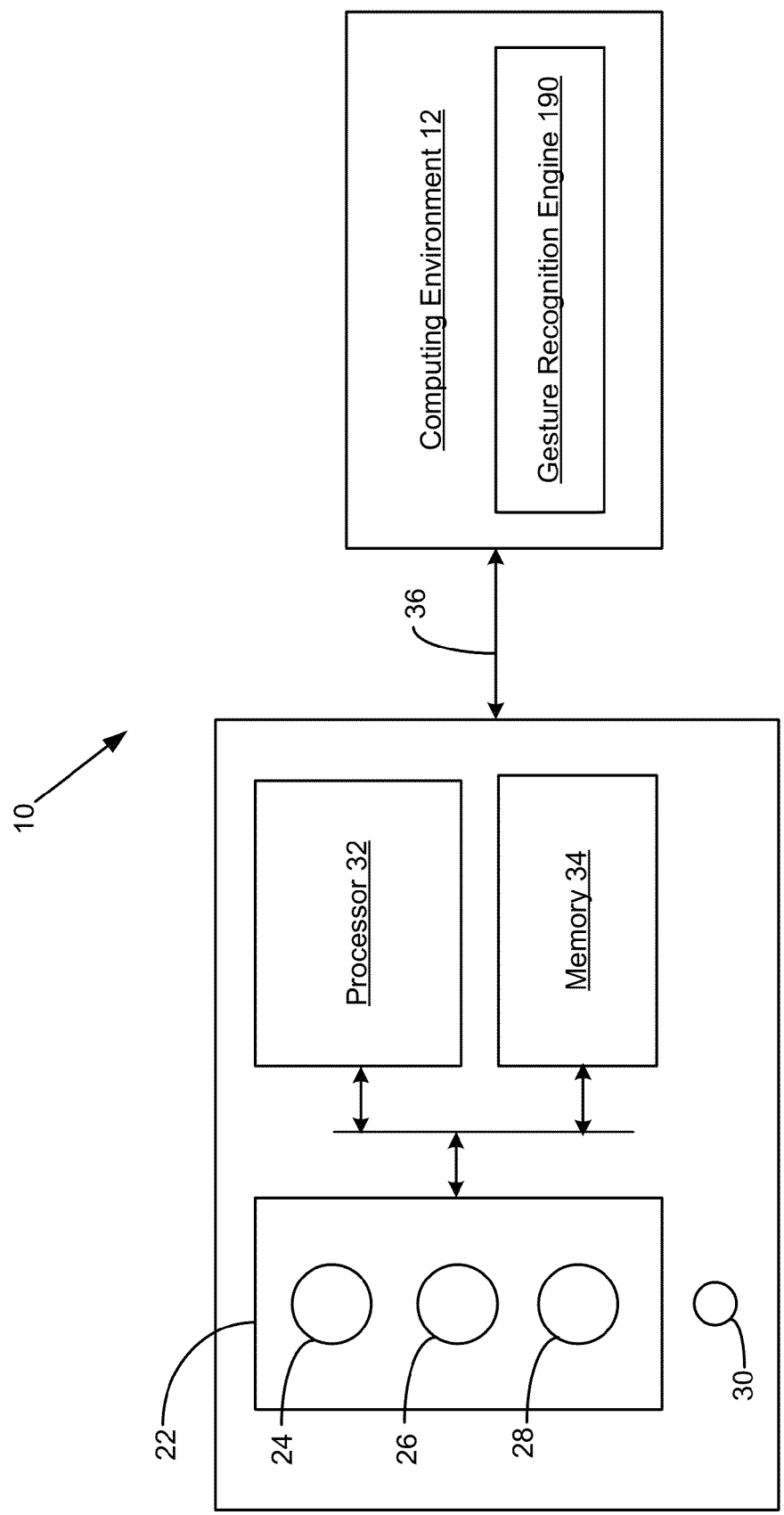
FIG. 2 illustrates an example embodiment of a capture device that may be used in a target recognition, analysis, and tracking system.

Referring initially to FIGS. 1A-2, the hardware for implementing the present technology includes a target recognition, analysis, and tracking system 10 which may be used to recognize, analyze, and/or track a human target such as the user 18. Embodiments of the target recognition, analysis, and tracking system 10 include a computing environment 12 for executing a gaming or other application, such as an interactive story application as explained below. The computing environment 12 may include hardware components and/or software components such that computing environment 12 may be used to execute gaming and non-gaming applications. In one embodiment, computing environment 12 may include a processor such as a standardized processor, a specialized processor, a microprocessor, or the like that may execute instructions stored on a processor readable storage device for performing processes described herein.

The system 10 further includes a capture device 20 for capturing image and audio data relating to one or more users and/or objects sensed by the capture device. In embodiments, the capture device 20 may be used to capture information relating to movements, gestures and speech of one or more users, which information is received by the computing environment and used to render, interact with and/or control aspects of a gaming or other application. Examples of the computing environment 12 and capture device 20 are explained in greater detail below.

Embodiments of the target recognition, analysis and tracking system 10 may be connected to an audio/visual device 16 having a display 14. The device 16 may for example be a television, a monitor, a high-definition television (HDTV), or the like that may provide game or application visuals and/or audio to a user. For example, the computing environment 12 may include a video adapter such as a graphics card and/or an audio adapter such as a sound card that may provide audio/visual signals associated with the game or other application. The audio/visual device 16 may receive the audio/visual signals from the computing environment 12 and may then output the game or application visuals and/or audio associated with the audio/visual signals to the user 18. According to one embodiment, the audio/visual device 16 may be connected to the computing environment 12 via, for example, an S-Video cable, a coaxial cable, an HDMI cable, a DVI cable, a VGA cable, a component video cable, or the like.

As shown in FIGS. 1A and 1B, in an example embodiment, the story application executing on the computing environment 12 may present any of various story settings. FIG. 1A shows a scene 19 including a house 21, monsters 23 and clouds 25. As explained below, a user may interact with the scene 19 in a variety of ways. In one example, a user may move clouds 25 together as shown which may alter the linear story presented by the story application. For example, moving the clouds together may cause it to rain.

In embodiments, the computing environment 12, the A/V device 16 and the capture device 20 may cooperate to render an onscreen character 23 on display 14 which is at least partially controlled by the user 18. As shown in FIG. 1B, the onscreen character 23 mimics the movements of the user 18 in real world space in a monkey-see-monkey-do fashion. Thus, the user 18 may perform movements which control the movements and actions of the character 23 on the display 14.

Moreover, a user may perform certain movements which are recognized by the computing environment as predefined gestures. These predefined gestures may cause a controlled character 23 to perform certain actions associated in memory with the predefined gestures. Predefined gestures may be used to initiate a variety of other actions as explained below.

The scene 19 of FIGS. 1A and 1B is one of many different scenes which may be generated by the story application running on computing environment 12. Moreover, the system 10 may further be used to interpret user 18 movements as operating system and/or application controls that are outside the realm of the story application running on computing environment 12.

Suitable examples of a system 10 and components thereof are found in the following co-pending patent applications, all of which are hereby specifically incorporated by reference: U.S. patent application Ser. No. 12/475,094, entitled "Environment And/Or Target Segmentation," filed May 29, 2009; U.S. patent application Ser. No. 12/511,850, entitled "Auto Generating a Visual Representation," filed Jul. 29, 2009; U.S. patent application Ser. No. 12/474,655, entitled "Gesture Tool," filed May 29, 2009; U.S. patent application Ser. No. 12/603,437, entitled "Pose Tracking Pipeline," filed Oct. 21, 2009; U.S. patent application Ser. No. 12/475,308, entitled "Device for Identifying and Tracking Multiple Humans Over Time," filed May 29, 2009, U.S. patent application Ser. No. 12/575,388, entitled "Human Tracking System," filed Oct. 7, 2009; U.S. patent application Ser. No. 12/422,661, entitled "Gesture Recognizer System Architecture," filed Apr. 13, 2009; U.S. patent application Ser. No. 12/391,150, entitled "Standard Gestures," filed Feb. 23, 2009; and U.S. patent application Ser. No. 12/474,655, entitled "Gesture Tool," filed May 29, 2009.

FIG. 2 illustrates an example embodiment of the capture device 20 that may be used in the target recognition, analysis, and tracking system 10. In an example embodiment, the capture device 20 may be configured to capture video having a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight.

As shown in FIG. 2, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 2, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28.

In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device 20 to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as a grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device 20 to a particular location on the targets or objects.

According to another embodiment, the capture device 20 may include two or more physically separated cameras that may view a scene from different angles, to obtain visual stereo data that may be resolved to generate depth information. In another example embodiment, the capture device 20 may use point cloud data and target digitization techniques to detect features of the user.

The capture device 20 may further include a microphone 30. The microphone 30 may include a transducer or sensor that may receive and convert sound into an electrical signal. According to one embodiment, the microphone 30 may be used to reduce feedback between the capture device 20 and the computing environment 12 in the target recognition, analysis, and tracking system 10. Additionally, the microphone 30 may be used to receive audio signals that may also be provided by the user to control applications such as game applications, non-game applications, or the like that may be executed by the computing environment 12.

In an example embodiment, the capture device 20 may further include a processor 32 that may be in operative communication with the image camera component 22. The processor 32 may include a standardized processor, a specialized processor, a microprocessor, or the like that may execute instructions that may include instructions for receiving the depth image, determining whether a suitable target may be included in the depth image, converting the suitable target into a skeletal representation or model of the target, or any other suitable instruction.

The capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image camera component 22 and the processor 32. According to another embodiment, the memory component 34 may be integrated into the processor 32 and/or the image camera component 22.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28, and a skeletal model that may be generated by the capture device 20 to the computing environment 12 via the communication link 36. A variety of known techniques exist for determining whether a target or object detected by capture device 20 corresponds to a human target. Skeletal mapping techniques may then be used to determine various spots on that user's skeleton, joints of the hands, wrists, elbows, knees, nose, ankles, shoulders, and where the pelvis meets the spine. Other techniques include transforming the image into a body model representation of the person and transforming the image into a mesh model representation of the person.

The skeletal model may then be provided to the computing environment 12 such that the computing environment may perform a variety of actions. The computing environment may further determine which controls to perform in an application executing on the computer environment based on, for example, gestures of the user that have been recognized from the skeletal model. For example, as shown, in FIG. 2, the computing environment 12 may include a gesture recognition engine 190 for determining when the user has performed a predefined gesture.

Figure 3A:
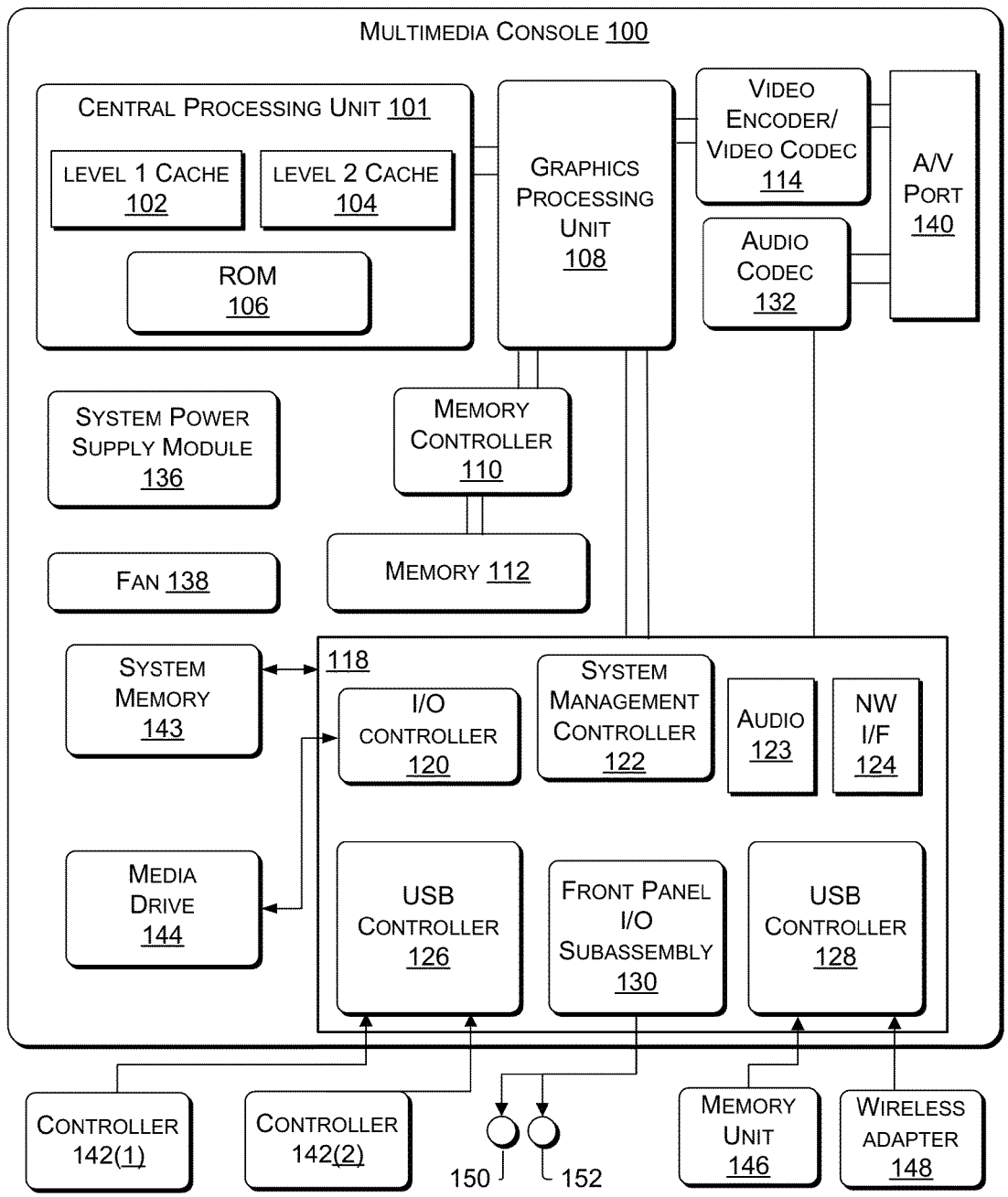
FIG. 3A illustrates an example embodiment of a computing environment that may be used to interpret one or more gestures in a target recognition, analysis, and tracking system.

FIG. 3A illustrates an example embodiment of a computing environment that may be used to interpret one or more positions and motions of a user in a target recognition, analysis, and tracking system. The computing environment such as the computing environment 12 described above with respect to FIGS. 1A-2 may be a multimedia console 100, such as a gaming console. As shown in FIG. 3A, the multimedia console 100 has a central processing unit (CPU) 101 having a level 1 cache 102, a level 2 cache 104, and a flash ROM 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the GPU 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM.

The multimedia console 100 includes an I/O controller 120, a system management controller 122, an audio processing unit 123, a network interface controller 124, a first USB host controller 126, a second USB host controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of the application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches. The cameras 26, 28 and capture device 20 may define additional input devices for the console 100.

Figure 3B:
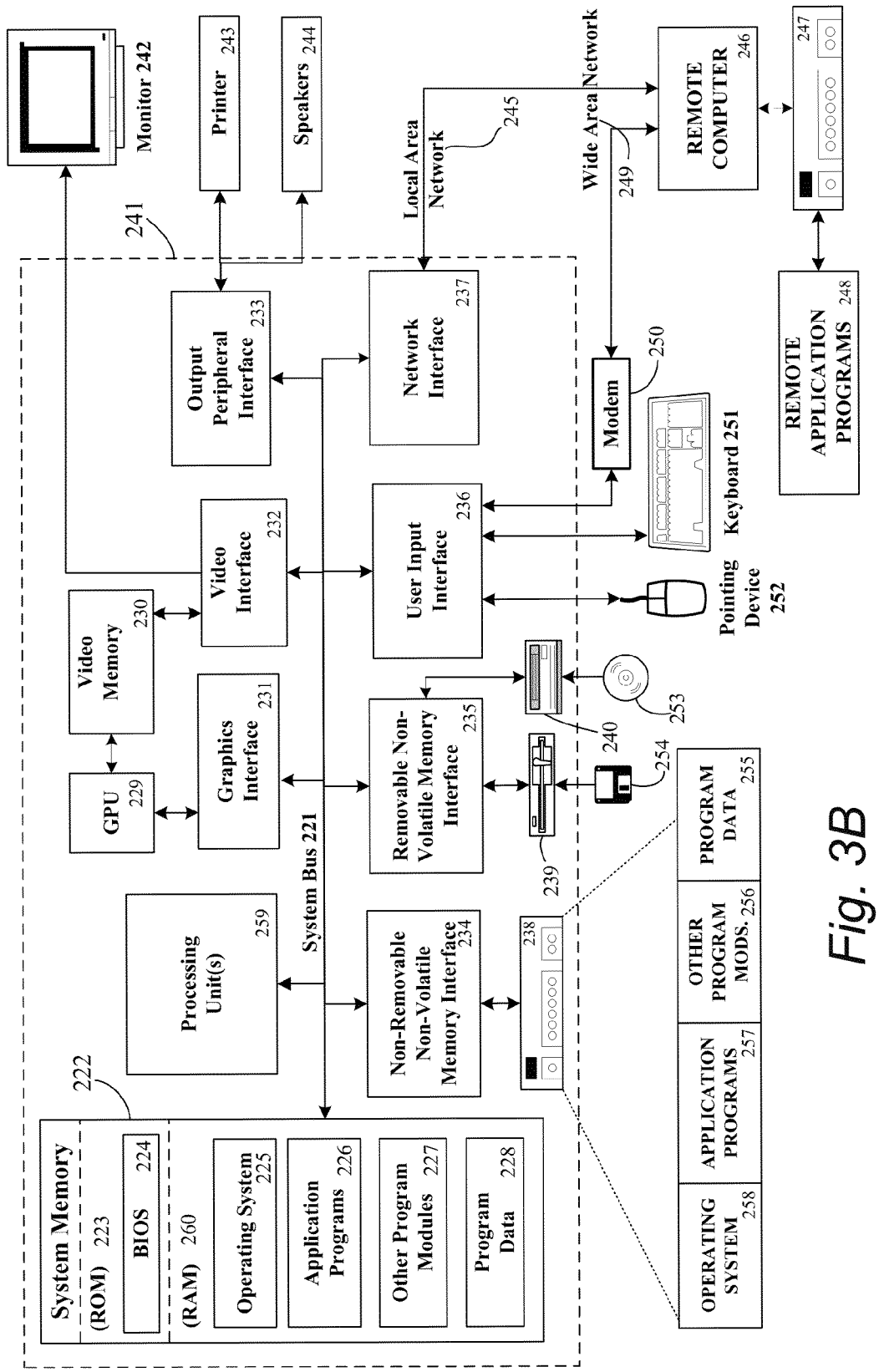
FIG. 3B illustrates another example embodiment of a computing environment that may be used to interpret one or more gestures in a target recognition, analysis, and tracking system.

FIG. 3B illustrates another example embodiment of a computing environment 220 that may be the computing environment 12 shown in FIGS. 1A-2 used to interpret one or more positions and motions in a target recognition, analysis, and tracking system. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments, the various depicted computing elements may include circuitry configured to instantiate specific aspects of the present disclosure. For example, the term circuitry used in the disclosure can include specialized hardware components configured to perform function(s) by firmware or switches. In other example embodiments, the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 3B, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as ROM 223 and RAM 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 3B illustrates operating system 225, application programs 226, other program modules 227, and program data 228. One example of application program 226 is a story application 226 used for presenting an interactive story experience to a user as explained herein. FIG. 3B further includes a graphics processor unit (GPU) 229 having an associated video memory 230 for high speed and high resolution graphics processing and storage. The GPU 229 may be connected to the system bus 221 through a graphics interface 231.

The computer 241 may also include other removable/non-removable, volatile/nonvolatile computer storage media. By way of example only, FIG. 3B illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 3B, provide storage of computer readable instructions, data structures, program modules and other data for the computer 241. In FIG. 3B, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and a pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 3B. The logical connections depicted in FIG. 3B include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 3B illustrates remote application programs 248 as residing on memory device 247. It will be appreciated that the network connections shown are exemplary and other means of establishing a communications link between the computers may be used.

Figure 4:
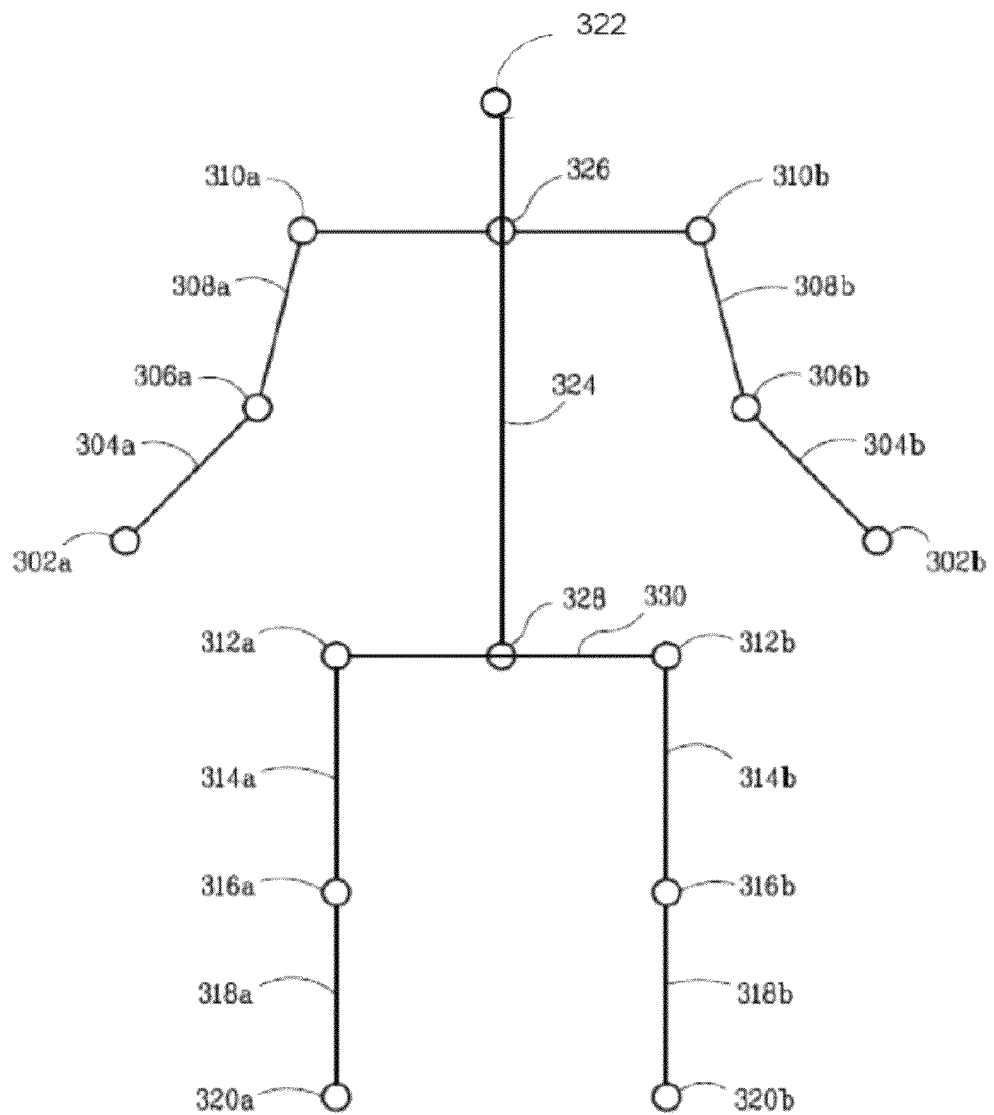
FIG. 4 illustrates a skeletal mapping of a user that has been generated from the target recognition, analysis, and tracking system of FIGS. 1A-2.

FIG. 4 depicts an example skeletal mapping of a user that may be generated from the capture device 20. In this embodiment, a variety of joints and bones are identified: each hand 302, each forearm 304, each elbow 306, each bicep 308, each shoulder 310, each hip 312, each thigh 314, each knee 316, each foreleg 318, each foot 320, the head 322, the torso 324, the top 326 and the bottom 328 of the spine, and the waist 330. Where more points are tracked, additional features may be identified, such as the bones and joints of the fingers or toes, or individual features of the face, such as the nose and eyes.

Figure 5:
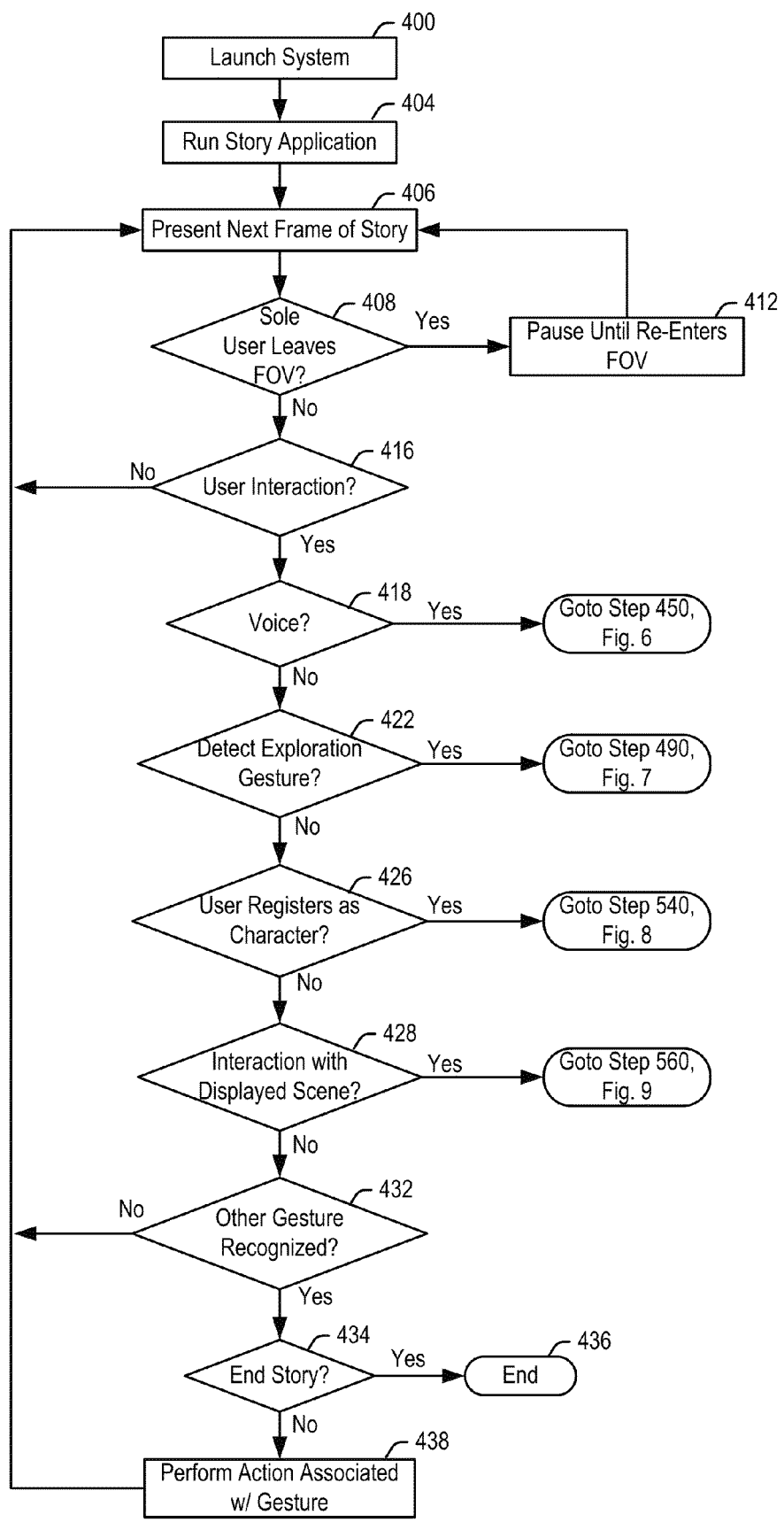
FIG. 5 is a high level flowchart of the operation of an embodiment of the present technology for providing an interactive story experience.

FIG. 5 is a high level flowchart of the operation of an embodiment of the present technology for presenting an interactive story experience via a natural user interface. At step 400, a user may launch the system 10 and activate computing environment 12 and capture device 20. In step 404, the system 10 runs a story application 226. In step 406, the story application presents the next frame of a story to the user over display 14.

The story may be presented graphically over display 14 and may have an associated audio narrative. The story may be displayed in discrete, still-image panels, i.e., a series of static images presented in succession as still frames on display 14. The story may alternatively be presented in dynamic computer-graphics (CG) animation, or as scenes shot with a video camera with live actors. The audio narrative may be audio presented by the story application, by a user and/or by a third party not present while the story is presented, as explained below. The audio narrative may also include dialog between characters of a presented story. Again, this dialog between characters may be presented by story application, by one or more users and/or by one or more third parties not present while the story is presented.

In embodiments using CG animation, the story application 226 may present a first frame of animation generated by the GPU of the computing environment 12, which frame may be refreshed at the refresh rate of the capture device (for example at 30 Hz). The frame rate may be quicker or slower than that in further embodiments. In embodiments using static-image panels, a static image is akin to a page of a book or comic. The static image may be presented on the display for example for several seconds. In embodiments using video, the frame may be refreshed at the frame rate of the video, which may again be for example at 30 Hz.

In embodiments, upon running the story application, a user 18 need not interact with the presented story. That is, the user may simply view and/or listen to the story as it plays from start to end. In further embodiments described below, a user may alternatively interact with the story presented by the story application 226.

The capture device 20 is monitoring the user as a user watches and/or interacts with the story application. In step 408, if the capture device 20 senses the user leaving the field of view, the story application may pause at step 412 until the user reenters the field of view. Steps 408 and 412 may be omitted in further embodiments. As indicated above, a user may simply sit and view and/or listen to the story presented by the story application. In step 416, if no user interaction is sensed, the story will simply continue until its completion. However, if user interaction is sensed in step 416 the system in general determines the interaction and performs different operations depending on the interaction as explained below.

In step 418, the story application may check whether the microphone array 30 of capture device 20 detected a voice. Techniques are known for differentiating sounds picked up by the microphone array 30 to determine whether one or more of the sounds is a human voice. Microphone array 30 may include various known filters, such as for example a high pass filter, to attenuate low frequency noise which may detected by the microphone array 30.

Figure 6:
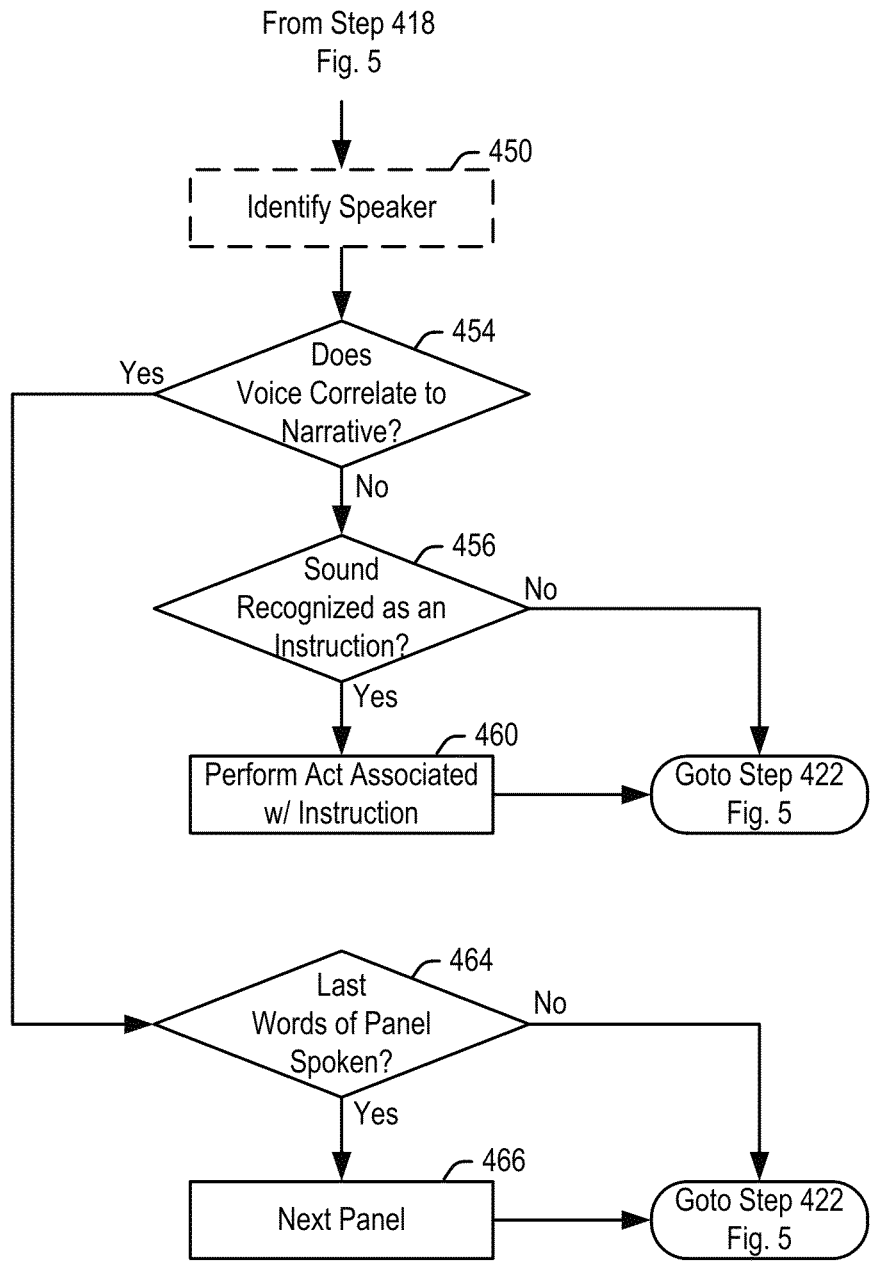
FIG. 6 is a flowchart of the operation of an embodiment of the present technology for correlating a voice detected by the capture device with the interactive story experience.

If a voice is detected in step 418, the system performs the steps set forth in FIG. 6 as will now be described. In embodiments, it may be desirable to identify whether a particular user is the speaker or whether the voice is coming from some other source. Various techniques exist for associating a voice with a user within the field of view, such as for example prior correlation of voice characteristics to a particular user, and acoustic source localization techniques. These and other techniques may be used to identify a speaker in step 450. Step 450 may be omitted in further embodiments.

The story application may have associated narrative for narrating the story which may be broadcast over speakers associated with the audio/visual device 16. However, a narrative may alternatively be displayed in words on the screen so that they can be read by a user listening to the story. In one example, a child may be learning to read, or a parent may be reading the story to the child as the child watches the story unfold on display 14. As an alternative to the words appearing on the screen, a user may have a computing device that is paired to the computing environment 12 and participating in the same instance of the story application 226. In such embodiments, the words for the narrative may be displayed on the user's paired computing device instead of on display 14.

In further embodiments, it is envisioned that the narrative be read by a third party who is not then present when the story application 226 is showing the story on system 10. While the third party could be anyone, in embodiments, the third party may for example be a parent or grandparent who is not then present when the story application is running, but is desirous of being the voice of the narrative presented to a child listening to and watching the story on system 10.

In such embodiments, a third party may have pre-recorded the narrative for the story application and that recording may be played back as the story application is running to provide the narrative for the story. In this embodiment, the recording may be played back on an audio playback device either associated with or not associated with the system 10. In a further embodiment, a third party may be reading the narrative for the story application 226 in real time as the story application runs on the system 10, but the third party is connected via a telephone or VOIP connection to the computing environment 12.

In step 454, the story application determines whether the voice perceived in step 418 correlates to a narrative for the story. Known voice analysis techniques may be used for this purpose, including parsing the known words of the narrative into phonemes, doing the same for the voice perceived by the microphone array 30, and comparing the two phoneme streams to find a match.

If, in step 454, the spoken voice is correlated to the narrative of the story application, the spoken voice may set the pace with which the story application advances the story. For example, where the story is presented in still image panels, the story application may determine in step 464 whether the last words of the narrative associated with a particular panel have been spoken. If not, it is not yet time to advance to the next panel and the flow may return to look for the next interaction as explained below with respect to FIG. 5. On the other hand, if the story application determines that the last words of the narrative associated with a particular panel have been spoken, the story application may advance to the next panel in step 466. The flow may return to look for the next interaction as explained below with respect to FIG. 5.

Where the image is video or dynamic animation, the story application may correlate the narrative to the spoken voice and speed up or slow down the displayed images to synchronize with the pace of the narrative spoken by the user or third party. The story application may cycle through the flowchart of FIG. 5 and may periodically check for a voice, check whether the voice correlates to a narrative of the presented story, and synchronize the presented images with the pace of the spoken narrative.

If the story application is unable to correlate a voice with a narrative in step 454, the application may next check in step 456 if the sound is recognized as an audible instruction to the story application or to the operation of system 10. If not, the computing environment 12 may return to FIG. 5 to look for another possible interaction of a user with the story application in step 422 as explained below. On the other hand, if the voice is recognized as instruction in step 456, the act associated with that instruction may be performed in step 460, and the system may then return to the flowchart of FIG. 5 to check for the next interaction.

Returning now to FIG. 5, in step 422 the present system may look for a specific type of gesture, referred to herein as an "exploration gesture." In particular, it is a feature of the present technology to allow one type of interaction where a user, in effect, steps into the virtual world presented on the display 14, and explores and/or investigates virtual objects on the display. As one of a wide variety of examples, the story may display a room to a user. With no interaction by the user, the user may be shown the room for a period of time and then the story may move on to show other locations. However, instead of simply moving on, the user may perform an exploration gesture, indicating their desire to explore and investigate virtual objects within the room to get a closer view and/or to see the objects from different perspectives. In embodiments, it is also contemplated that a user may perform gestures and motions interpreted by the computing environment 12 which enable a user to pick up and manipulate virtual objects within a scene.

In step 422 of FIG. 5, the computing environment 12 looks for a predefined exploration gesture. A wide variety of movements and gestures by the user may be set as predefined exploration gestures in embodiments of the present technology. In one such embodiment described now with respect to FIG. 10, the capture device 20 captures head and/or body movements of a user. For example, in FIG. 10, the user has bent to the side and craned their neck, as the user might when trying to peer around or behind an object in the real world. The operation of the gesture recognition engine 190 is explained below, but the recognition engine 190 may have a predefined rule to look for such body movements and, when found, interprets them as an exploration gesture. In addition to craning the neck and/or bending at the waist, the exploration gesture may additionally or alternatively include another gesture, such as for example a pointing gesture as shown in FIG. 10.

It is appreciated that a wide variety of other body movements may be defined as exploration gestures in further embodiments. In some such embodiments, the user movements may have a correlation in the real world to the action the user wishes to accomplish in the virtual world. One example is set forth above, where the user is bent to the side and craning their neck to signify their desire to look around or behind an object. In further embodiments, a user may also or alternatively walk in the direction of the display, indicating their desire to step into the virtual scene. In further embodiments, an arbitrary set of gestures may be defined which have no real world significance. However, the arbitrary body and/or voice gestures may be developed and recorded by the gesture recognition engine 190 so that, when performed, the gesture recognition engine recognizes them, and performs the associated action, such as stepping into a virtual scene to look behind an object.

Figure 7:
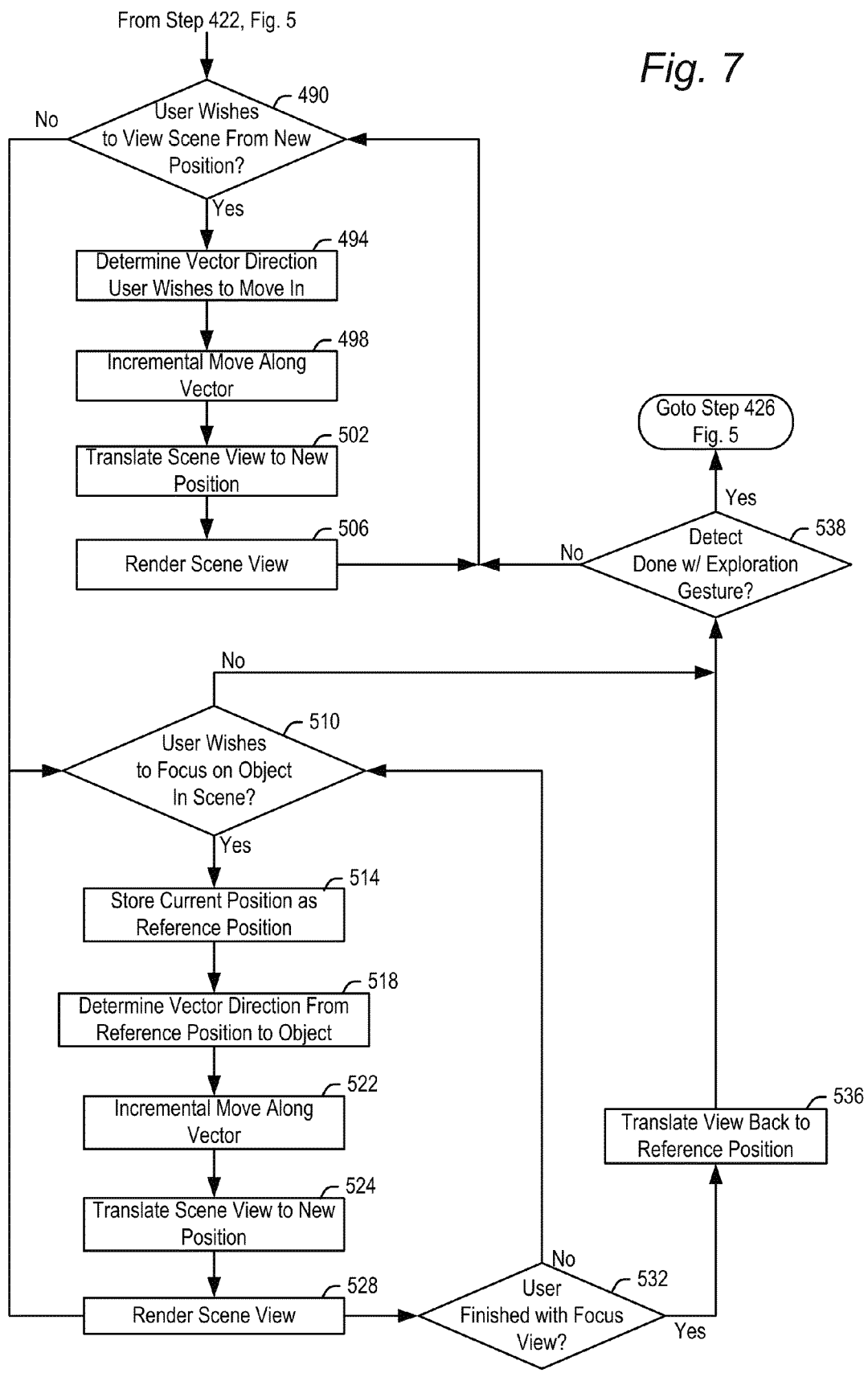
FIG. 7 is a flowchart of the operation of an embodiment of the present technology for 3-D exploration of a virtual scene.
Figure 8:
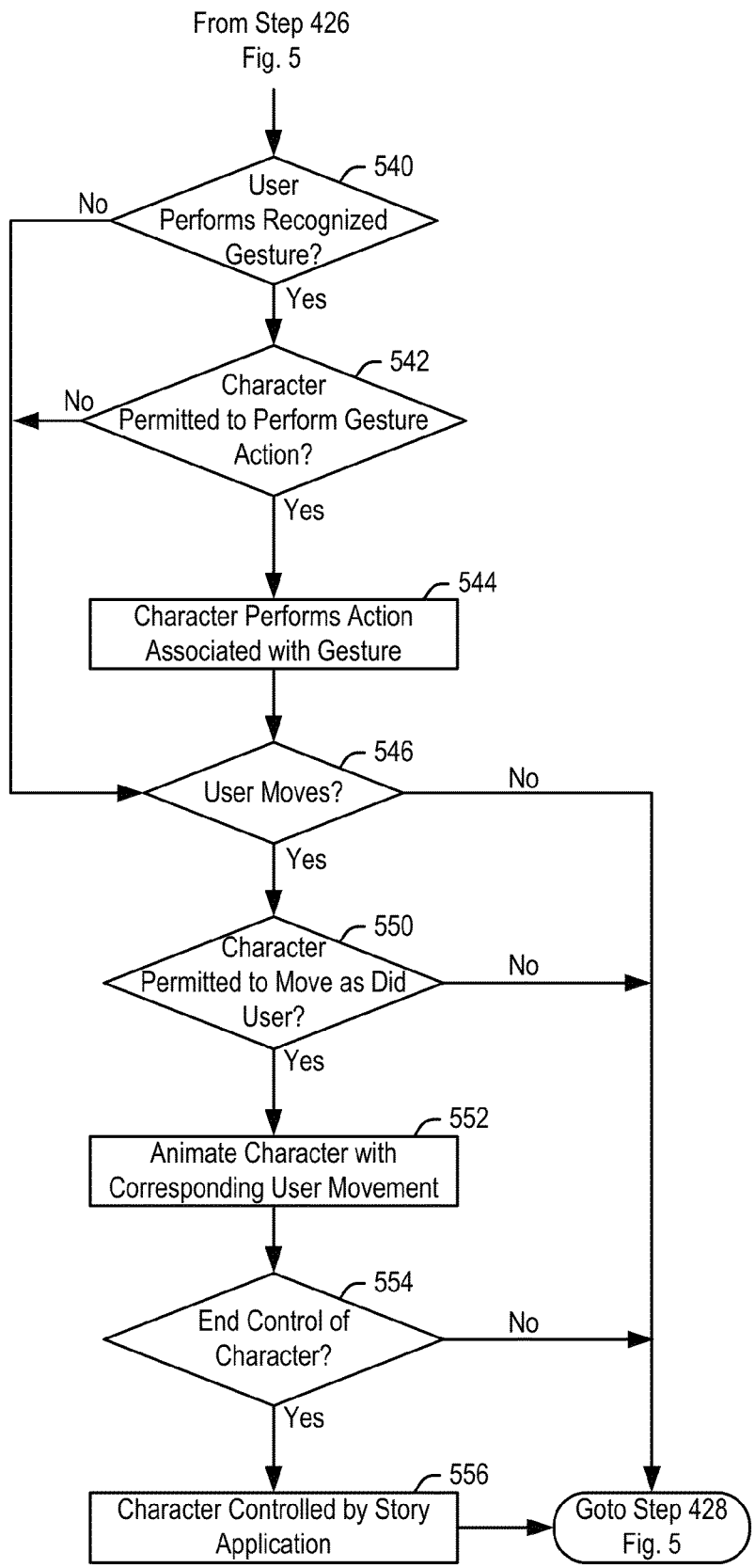
FIG. 8 is a flowchart of the operation of an embodiment of the present technology for a user controlling the actions of an onscreen character.

Once an exploration gesture is recognized in step 422, the computing environment 12 performs steps 490 through 538 as will now be described with respect to the flowchart of FIG. 7. In step 490, the computing environment 12 determines whether the user wishes to step into the three-dimensional virtual world showing the display to view a displayed scene from another position. Again, this desire, as well as the direction the user would like to take into the virtual scene are controlled by the user through predefined head, hand or other gestures. This embodiment may operate where the scene is presented in CG animation. Where the scene is presented in either static panels or recorded video, it is contemplated that CG animation may be cut into those display models to provide exploration of the virtual scene as explained below. In a further embodiment, the video may be shot in 360°, which allows some level of entry and exploration of the user into the video scene.

Figure 10:
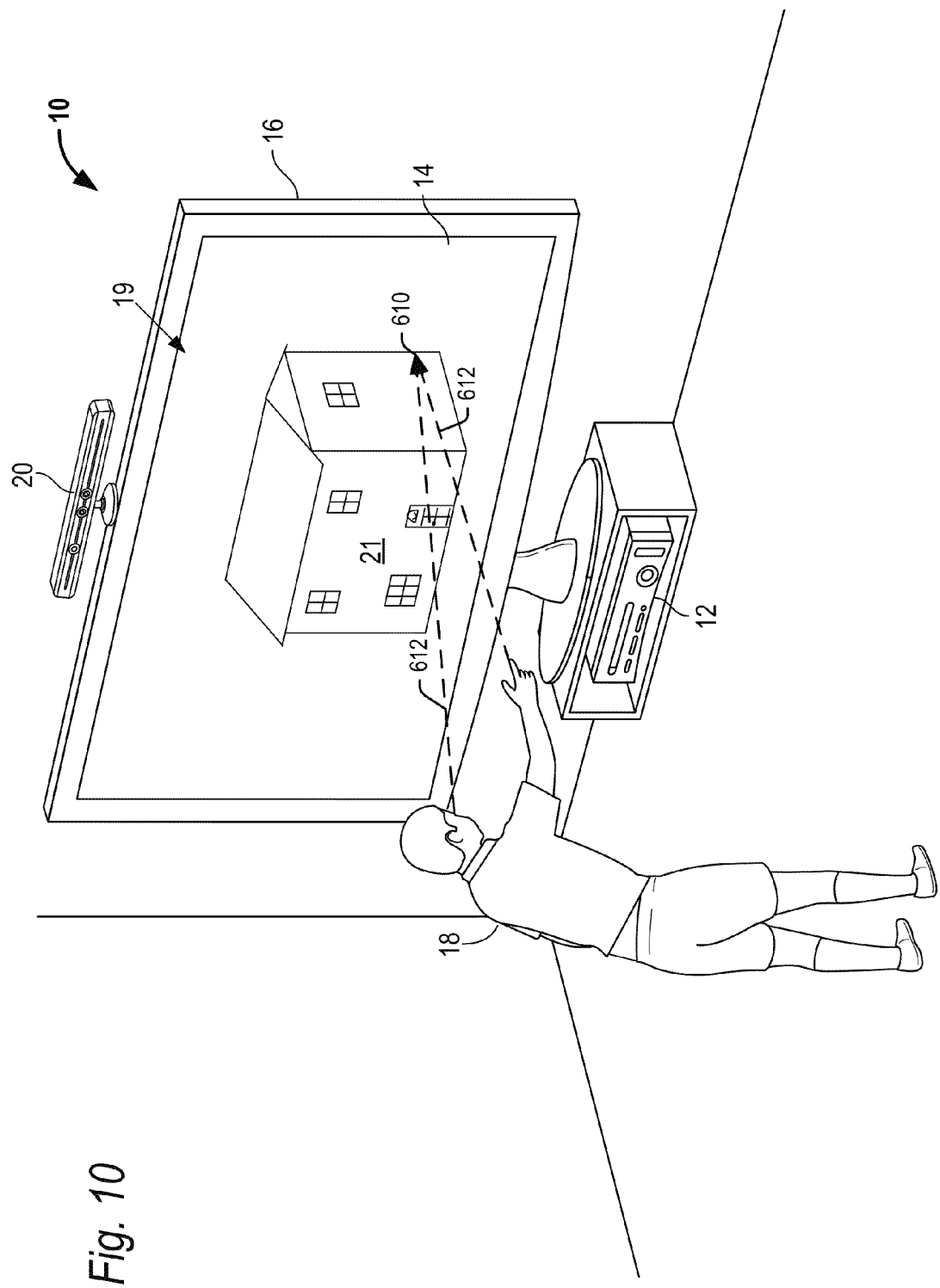
FIG. 10 is an example of a user performing an exploration gesture to explore and investigate virtual objects within a displayed scene.

As one example, once the exploration gesture is performed, the capture device 20 and computing device 12 may determine a point on the display on which the user is focused, such as for example a point 610 in FIG. 10. This point may be determined by capturing where the user's eyes are pointed and/or this point may be determined by capturing where a user's hand is pointed. In further embodiments, a user may also or alternatively walk in that direction. If it is determined in step 490 that the user wishes to view the scene from a different position, the computer environment may define a vector in step 494 along which the user desires to move in the virtual world.

The vector in step 494 may be determined based on one or more real world three-dimensional vectors 612 from a point of reference on the user to the point of interest 610 on the display. In FIG. 10, the vectors 612 are from the user's eyes to the point of interest 610 and from the user's pointed hand to the point of interest 610. The point of reference (eyes, hand, etc.) has a known x, y and z coordinate position.

The virtual scene shown on display 14 is represented in 3-D data. That is, the points in a virtual scene and on virtual objects within the scene are assigned x, y and z values to create a 3-D virtual space referred to herein as 3-D machine space. Given a known position of capture device 20 to the real world in which the user is moving, there is a known relation between the 3-D real world space and the 3-D machine space. As such, the vectors 612 may be translated from 3-D real world space to 3-D machine space using known transformation matrices. The translation of real world vectors 612 to 3-D machine space provide the vector in step 494 along which the user is to move into the 3-D virtual scene. As explained below, in order to create the effect of the user moving into the virtual scene and examining virtual objects, the perspective of the display changes to provide a view of different areas and objects of a scene, and from different zoomed in or zoomed out positions. Again, this is possible because virtual objects are not merely defined as two-dimensional points on the display, but rather have 3-D definitions in machine space.

In step 498, instead of immediately repositioning the user at a desired location, the user's view into the virtual machine world may be changed incrementally. The increments at which the user's view changes may be arbitrarily set, but in embodiments, the view changes so as to create the impression that the user is walking into the scene at a normal walking pace. In step 502, the view of the scene displayed on display 14 may be updated to the incrementally changing view of step 498. Again, transformation matrices are known for translating the view of the displayed scene to any perspective of the 3-D machine space. In step 506, the scene may be rendered from the view of the new position determined in step 502.

The routine may then return to step 490 to determine if the user has arrived at the position within the virtual scene at which they would like to investigate an object or whether they would like to continue to move within the virtual scene. This may be indicated by the user's body position and where the user is focused on the display, or by some other arbitrary body movement or voice gesture. If the user would like to continue to move within the virtual scene, steps 490 through 506 are repeated until the user has arrived at their desired position within the virtual scene.

If step 490 determines the user is at the desired position in the virtual scene (i.e., the scene is presented on the display from the desired perspective), the flow may branch to step 510 to determine if a user wishes to focus more closely on an object within the scene at that position. Again, this desire may be indicated by one or more predefined gestures, either mimicking real world movements that a user would make to move to and/or focus on objects in the real world, or arbitrary gestures which are defined for the purpose of navigating and focusing on objects within the virtual world.

If it is determined in step 510 that the user wishes to focus more closely on an object in the scene, the computing environment 12 stores the current position (i.e., the current view of the scene) as a reference position in step 514. As explained below, this reference position will be used as the view to which the system returns when the user is done focusing in on a particular virtual object. In step 518, the computing environment 12 determines a vector direction from the reference position to the virtual object. This may be accomplished as described above by detecting in the real world the user's head position in x, y, z space and where the user is looking on the display, and thereafter translating that vector into a vector in virtual machine space.

In step 522, an intermediate incremental position along this vector may be determined as described above. In step 524, the perspective of the scene may be translated to the position determined in step 522, and in step 528, the scene may be rendered from the view determined in step 524. In step 532, the system may determine if a user is finished focusing on a particular object within the virtual scene. This may be indicated by any of a variety of predefined gestures. If the system does not determine that a user is finished with the focus view, the flow returns at step 510, and steps 510 through 528 may be repeated to provide further and additional focus on virtual objects within the scene. On the other hand, if a user performs a predefined gesture in step 532 indicating that the user has completed their focused view, the view may be translated back in step 536 to the view from the reference position (stored in step 514).

If the computing environment 12 is unable to discern additional exploration gestures in steps 490 and 510, the flow may branch to a step 538 to see if a user performs a predefined gesture indicating that they are done exploring the scene. If not, the flow may loop back to step 490 to see if a user wishes to view the scene from a different position, and if not, the flow moves to step 510 to determine if the user wishes to focus on an object within the scene at that current position. On the other hand, if some predefined gesture is performed indicating the user is finished with exploring within the 3-D scene in step 538, the flow may return to FIG. 5 to check for the next type of user interaction.

It is appreciated that steps 490 through 538 are merely one example of how a user may move into and around the three-dimensional virtual world provided on a display 14 by the story application.

In embodiments of the present system, in addition to watching a story and exploring within a 3-D virtual world, a user may also have the option of controlling one or more characters within the story. This embodiment may operate where the scene is presented in CG animation. Where the scene is presented in either static panels or recorded video, it is contemplated that CG animation may be cut into those display models to provide character control as explained below.

In embodiments, a user 18 may perform some predefined gesture indicating the user's desire to control the movements and/or actions of an onscreen character 23. The predefined gestures may for example be arbitrary gestures coupled with a user motion for example pointing at a given character onscreen. When such character control is permitted by the story application 226, the user may be registered as that character in step 426 and the user may thereafter control that character as described below with respect to steps 540 through 558 of FIG. 8.

After a user is registered as controlling a character, the user may perform certain motions and gestures which are used to animate and affect the behavior of the controlled onscreen character. In step 540, the computing environment determines whether a user has performed a predefined, recognized gesture. If so, the computing environment checks at step 544 whether the onscreen character is permitted to perform the action corresponding to the recognized gesture. In particular, in embodiments, the user does not have complete control over the onscreen character's action or behavior, but rather shares control of the onscreen character with the story application 226. In embodiments, the user may control a character's movement to an extent, but the application may define boundaries to such movements, and may limit control of other aspects of the onscreen character, such as for example as relating to the character's behavior and personality. Unfettered control of the onscreen character by a user may prevent the story application from moving forward, if for example the user causes the onscreen character to perform certain actions that were not anticipated as possible story branches (explained below). However, it is understood that in further embodiments, a user may be given unfettered control of an onscreen character.

If a character 23 is permitted to perform the gesture action in step 542 by the story application, the character performs that action associated with the gesture in step 544. FIG. 1B shows an example where a user is given the ability to control the upper body of an onscreen character 23. This particular story application may recognize a gesture of a user raising their arms, and having that correspond to an onscreen character, such as for example a monster, raising their arms in a menacing manner. Upon recognition of such a user gesture in step 540 of FIG. 8, the character performs the corresponding action in step 544.

If no recognized gesture was performed in step 540, the computing environment next checks in step 546 whether user movement is detected by the capture device 20. If so, the system checks at step 550 whether the onscreen characters are permitted to move as did the user, as set forth above. If so, the onscreen character is animated with the user's movement in a monkey-see-monkey-do fashion in step 552. If the computing environment does not detect a predefined gesture in step 540 or user movement in step 546, the computing environment may return to step 428 of FIG. 5 to detect other user interaction with the scene as explained below.

In step 554 the system next checks whether the user has given some sort of predefined gesture indicating their desire to end control of the character. If such gesture is detected in step 554, the user's control of the character ends and the character is completely controlled by the story application 226 in step 556. If the system detects user movement at step 546 but the character is not permitted to move in that manner in step 550, or if the user ends control of the character at step 554, the system may return to step 428 in FIG. 5 to look for other interaction of a user with a displayed scene.

Returning now to FIG. 5, at step 428 the computing environment 12 looks for some interaction of the user with the displayed scene, and in particular a user interaction which may affect an outcome of a sub-plot of the story, or affect the overall outcome of the story. If such interaction is detected, the system performs steps 560 through 588 of FIG. 9. This may occur as a result of a voice command described above with respect to 418, an exploration gesture described above with respect to step 422, the user controlling an onscreen character as described above with respect to step 426, or some other interaction with the story.

The degree of interactivity may in part be determined by the type of images displayed in the story. CG animations may offer a high degree of interactivity, while still panels and recorded video may offer less. It is understood that CG animations may be cut into still panels and/or recorded video to provide greater interactivity. In embodiments, a user may be given the opportunity to interact with the onscreen story at discrete points in the story. These points may be indicated to the user by a pause in the story or some prompt. In further embodiments, a user may have the option to interact with the story at any point during the presentation of the story by application 226.

Upon interaction with a displayed scene at step 428, the system initially performs a step 560 of determining whether the user has performed a motion or a recognized gesture. If so, computing environment 12 next checks in step 564 whether the action associated with that motion or gesture requires a branch to a different story line. There are a variety of known methods for determining whether a user action requires a branch to a different story branch, and then determining how to proceed from that story branch. In one example, the story application may maintain state data values for all objects and characters within a story. When something with respect to a scene or character changes, the state data for the scene or character may change accordingly. These state data values may be used in rendering story objects or characters, and in controlling what happens with those objects or characters.

In embodiments, the story application may be able to branch to a variety of different story lines depending on the state data values for objects and characters, which state data may be altered as a result of user interaction with those objects and/or characters. In further embodiments, a user may perform certain gestures which do not interact with or affect onscreen objects or characters, but nonetheless may result in a change in the story line. As one example, a user may choose to leave a room displayed on the screen before vital aspects of the story to be shown and explained with respect to that room have been revealed.

In step 564, the computing environment 12 determines whether the action associated with a user-performed gesture requires a branch to a different story line. As noted, this may occur with state data values for objects and characters of a story that have been altered by a user. In particular, the state data values have changed so that continuing with the story as it existed prior to the user's gesture in step 560 would be inconsistent with the current state data values associated with objects, characters or the story as a whole. If the user's gesture requires a branch to a different story line, the computing environment 12 may check in step 568 whether there is a known branch of the story consistent with the user's interaction.

If the user does not perform a motion or recognized gesture in step 560, or the user's motion/recognized gesture does not require a branch to a different story line in step 564, the system may return to FIG. 5 to look for any other type of movement or gesture in step 432 as explained below. Moreover, if the user has performed an action requiring a branch to a different story line, but there is no branch consistent with the user's interaction known or identifiable by the story application 226, the effect of the user's gesture on the story line may be ignored in step 568 and the flow may return to step 432 in FIG. 5 as explained below.

Figure 11:
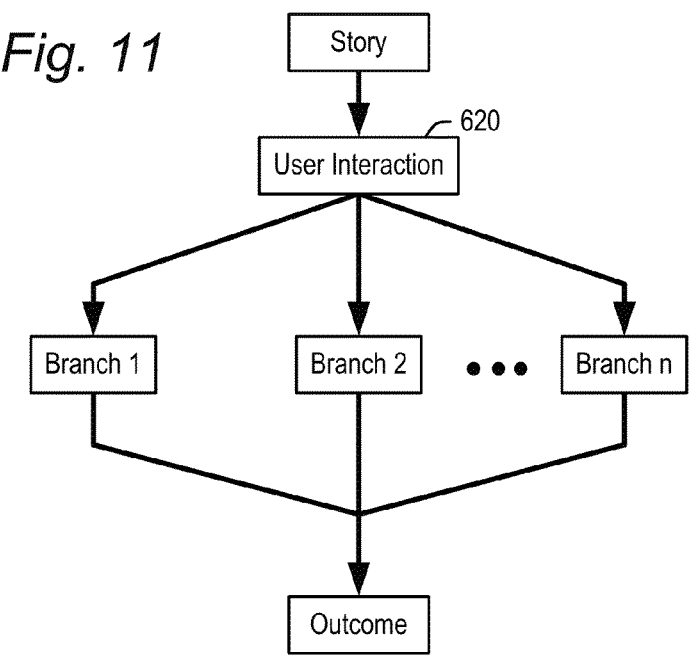
FIG. 11 illustrates a branching subplot which re-converges to a single story outcome.
Figure 12:
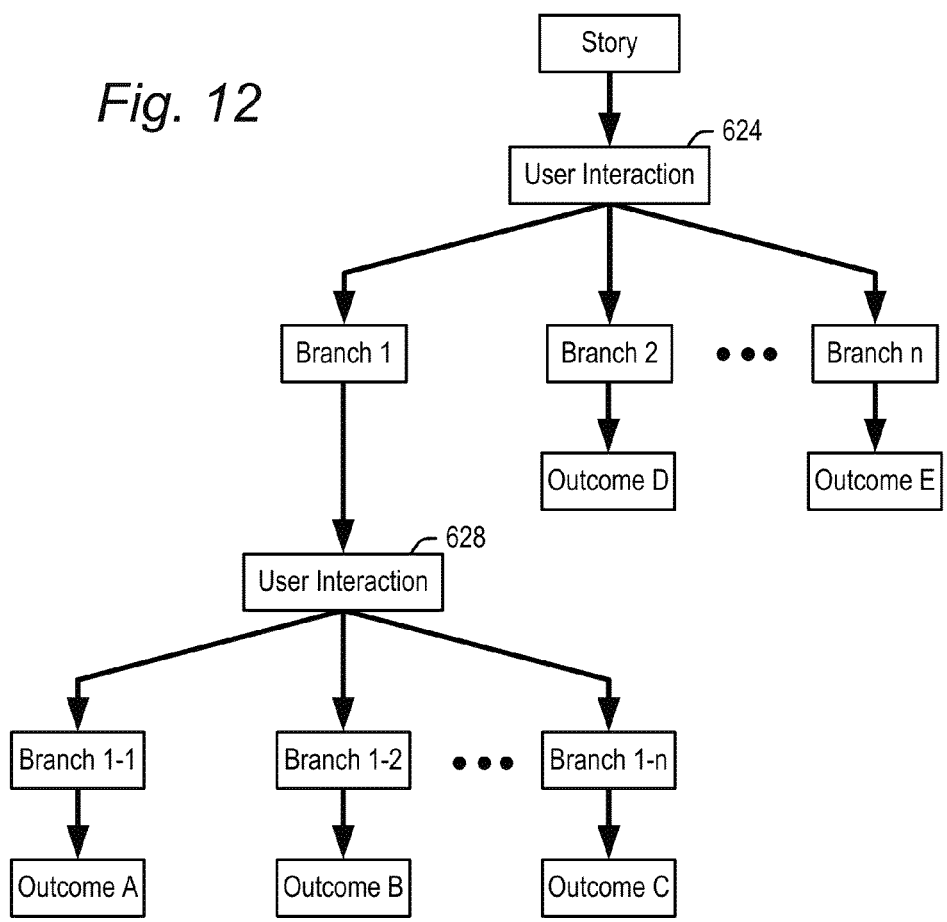
FIG. 12 illustrates a branching plot which results in one of a plurality of story outcomes.

Assuming a user's gesture requires a branch to a new branch story line, and that story line is capable of being performed by the story application, the story application may modify the state data associated with objects, characters and the application as a whole, depending on what motion or gesture the user performed. Referring to FIGS. 11 and 12, some user interactions affect a story branch varying only a sub-plot of the story, without effecting the overall outcome. As seen in FIG. 11, a user may perform some interaction 620 causing the story application to branch to branch 1, branch 2, . . . , branch N, and thereafter all the branches re-converge to continue with the original story line. A wide variety of such sub-plot story branches are envisioned. For example, in FIG. 1A, a user may perform gestures moving the clouds 25 together to the point where it rains over the house 21. The rain may have no effect on the overall plot. It may rain for a while, the rain may stop and the story line may continue as it would have had it not rained. In further embodiments, the application story may prompt a user to answer questions or solve puzzles, and the story line may branch to different sub-plots depending on the user's answers to the prompts. The story may re-converge and continue with the original story line once a user has successfully answered the questions or solved the puzzles.

On the other hand, other types of user interactions may affect a story branch varying the overall outcome of the story. In other words, the story will end differently depending on the user's interactions with the story. For example, in FIG. 11, a user performs an interaction 624 which causes a story branch to one of N branches which do not re-converge. Moreover, any one of those branches may then itself branch on further user interaction. For example, if user interaction 624 causes a story to branch to branch number 1, the user may perform another interaction 628 causing the story to branch to further possible outcomes. A story may have any number of sub-plot branches, or overall plot branches, depending on whether a story application is written to handle many sub-plot and overall plot branches.

In embodiments, a single user may perform interactions which cause a story application to perform sub-plot branches or overall plot branches. In further embodiments, multiple users may be viewing a story. These multiple users may be co-located or located at different locations, using different systems 10, which are networked together so the various users may share the same instance of application 226 and the same story experience. In such embodiments, the story application 226 may require the actions of several users acting in concert before the story line will branch to a new sub-plot or a new overall plot.

Returning now to FIG. 9, if the computing environment 12 has identified a user movement or gesture requiring a story line branch in step 564, and the story application is equipped to handle that new story line, the story application 226 branches to that new story line in step 570. The story application modifies the state data for any objects, characters or the application as a whole in step 572. In step 574, the story application 226 may render graphics for a scene in accordance with the new story line and state data, and the story application may continue with the identified branch in step 578.

One aspect of the present system is to add game mechanics to a story being shown to a user. Accordingly, in addition to showing a story, story application 226 may further keep a user's score which may be incremented or decremented depending on how the user interacts with the story. In particular, certain gestures or actions by a user may have a predetermined story value and an associated number of points which are to be added to, or subtracted from, the user's overall score upon performance of the associated gesture. Accordingly, in step 582, the story application checks whether there was a score associated with the user interaction performed in step 560. If not, the flow returns to step 432 in FIG. 5. If there is a score associated with the user's interaction, the user's score is adjusted accordingly in step 588, and then the flow may return to step 432 in FIG. 5 as described below.

Figure 9:
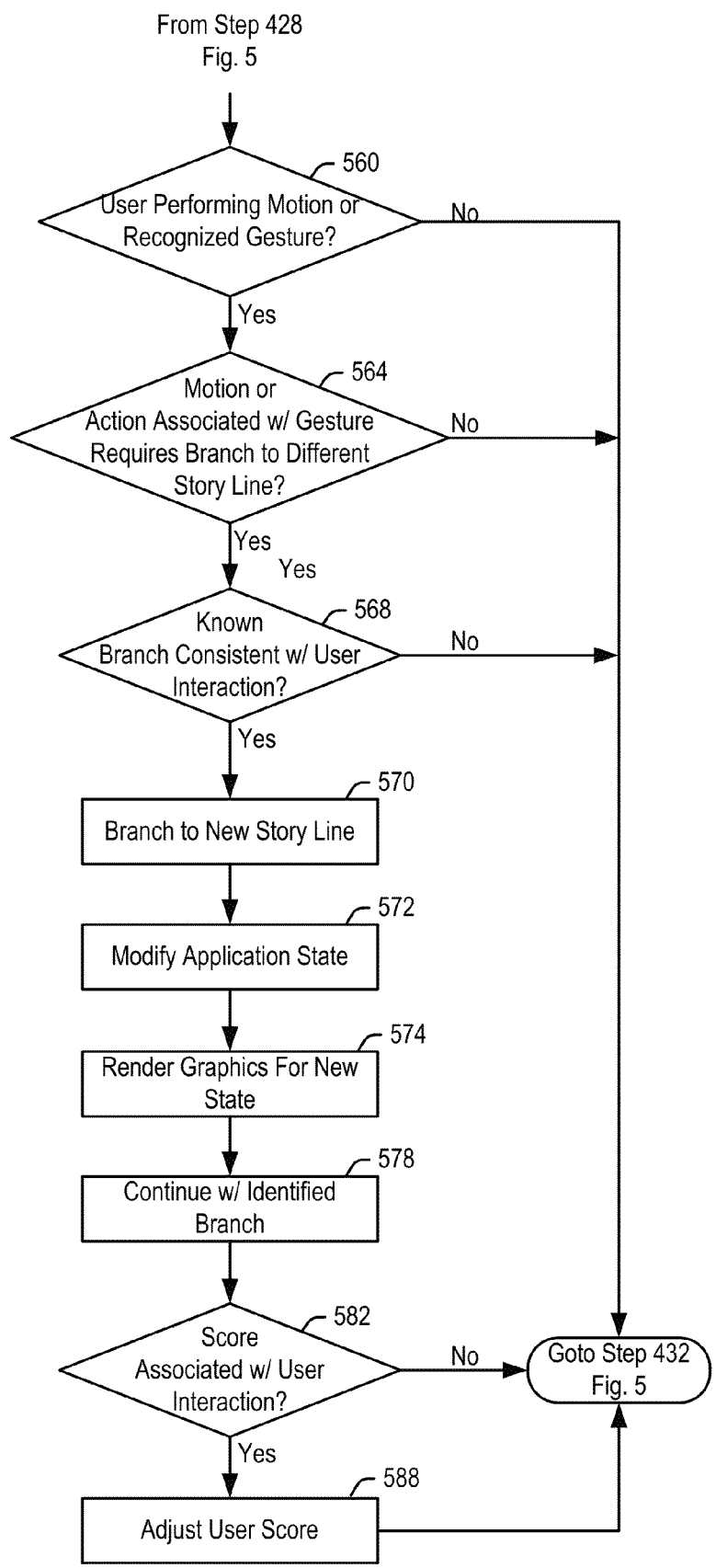
FIG. 9 is a flowchart of the operation of an embodiment of the present technology for a user interacting with a scene to alter a plot of the interactive story experience.
Figure 9A:
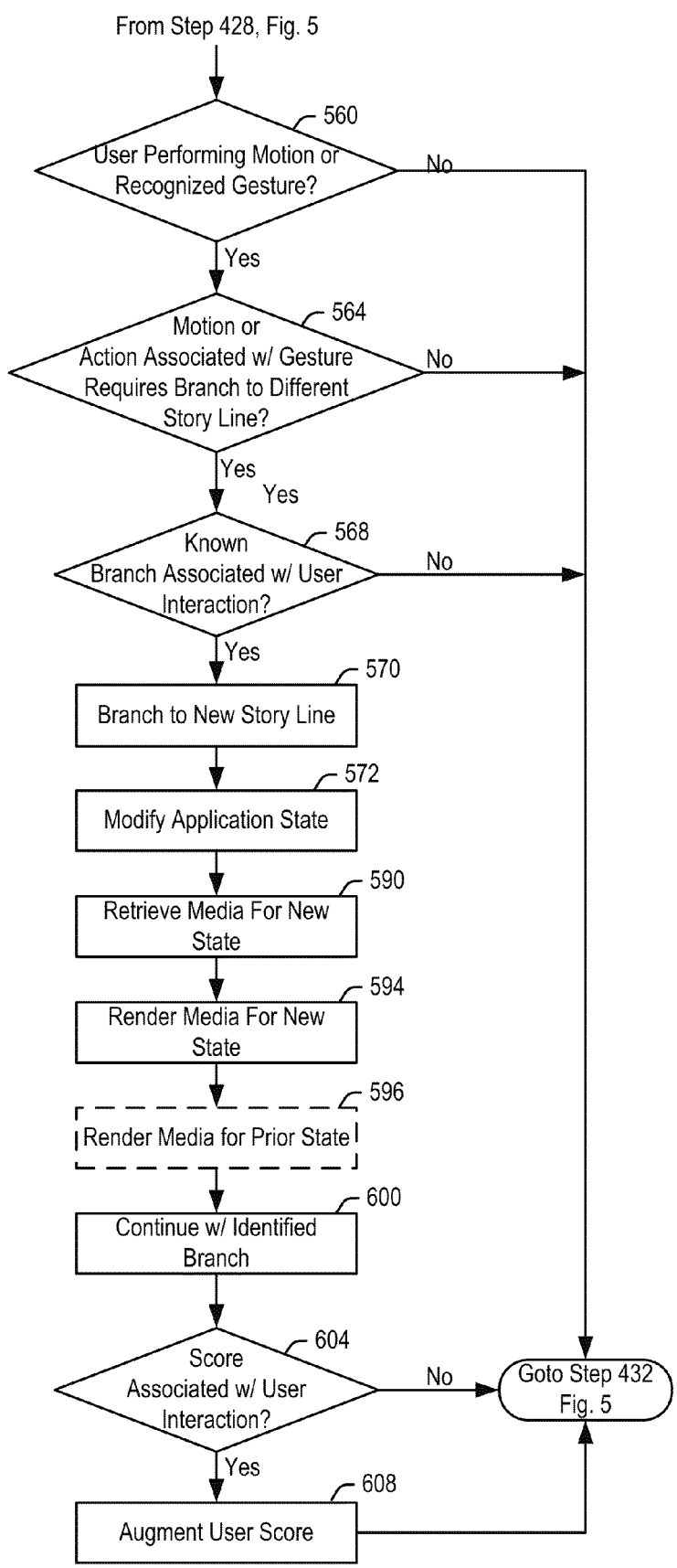
FIG. 9A is a flowchart of the operation of an alternative embodiment of the present technology for a user interacting with a scene to alter a plot of the interactive story experience where the scene is presented in pre-recorded video.

The embodiment of FIG. 9 may be used in stories using static image panels or dynamic CG image animation. FIG. 9A shows a further embodiment for use with recorded video. Steps 560 through 572 may be as described above for FIG. 9. In embodiments, interaction with recorded video would occur at predefined points of interaction with the video. For recorded video stories, the story application may have a different video clip for each possible branch of the story. In step 590, the story application may retrieve the media clip appropriate to the determined branch of the story. In step 594, the computing environment 12 may render that clip. As an alternative or addition to pre-recorded video clips for different branches, CG animations may be constructed by the computing environment and inserted.

After a user has been shown the images from the story branch, the story application 226 may then go back and show the media clip for the story, had the story not branched to a new line in a step 596. For example, the story may relate to a crime drama where detectives are about to interrogate a suspect. A user may perform a predefined gesture indicating that they wish to interact with the story application to interrogate the suspect. The user may ask questions, and may perform the interrogation in different ways and with different attitudes. These actions may be limited in scope, for example by a script from which the user can select questions. Alternatively, it may be any questions the user wishes to ask.

The user may also ask the questions with different attitudes, some more or less likely to work with the suspect character being interrogated. The user may attempt to bully the suspect, or the user may attempt to elicit information by proceeding with a pleasant demeanor. The capture device 20 is capable of detecting these different mannerisms, and these different mannerisms may be identified by the computing environment 12 if certain acts match defined and stored mannerism data. Once the user has completed the interrogation, a video clip of the detectives conducting the interrogation may be played. The user can see what they did better or worse than the detectives, as far as the amount of information he or she was able to get from the suspect in comparison to what the detective characters obtained in the replayed scene.

In step 600, the story line continues with the identified branch. It may reconvene with the original story line or it may result in a new outcome for the overall plot. In step 604, a user's interaction may be scored. For example, if a user was able to elicit more information than the detective characters did in the above example, the user may be awarded some predefined number of points. Alternatively, if the user elicited less information, they may lose a predetermined number of points. The user's score may be adjusted accordingly and the flow may return to step 432 of FIG. 5 as described below.

Returning to FIG. 5, it may happen that a user's gesture is not an exploration gesture in step 422, is not for the purpose of controlling a character in step 426, and does not interact with a displayed scene so as to change the story line in step 428. Accordingly, computing environment 12 checks for other such gestures in step 432. If no other such gesture is recognized in step 432, the story application loops back to step 406 to present the next frame of the story and the above-described steps repeat. On the other hand, if some other gesture is recognized in step 432, the system checks in step 434 whether that gesture is to end the story. If so, the story ends at step 436. Otherwise, in step 438, the system performs any action associated with a gesture recognized in step 432, and then the flow returns to step 406 to present the next frame of the story.

As noted above, if a user takes no action when receiving a story, the story may proceed linearly per a default set of images and/or narrative or dialog. In a further embodiment, even where a user takes no action, elements in the linear story may dynamically change relative to instances of the story based on various preset factors. These factors may include the number of times the story has been viewed (for example, something new happens the 4th time through); the number of people in the audience; and the weather or time of day (for example, the weather in the story changes with the seasons, or is tied to the real world weather). The weather or time of day may be known to the system 10 or stored within a service to which the system 10 is networked. Also, events in other stories could have an impact—being introduced to a character in story B makes them appear in story A. These features, along with the other features of the present system described above, make the stories more dynamic and encourage repeat viewing and experimentation.

Figure 13:
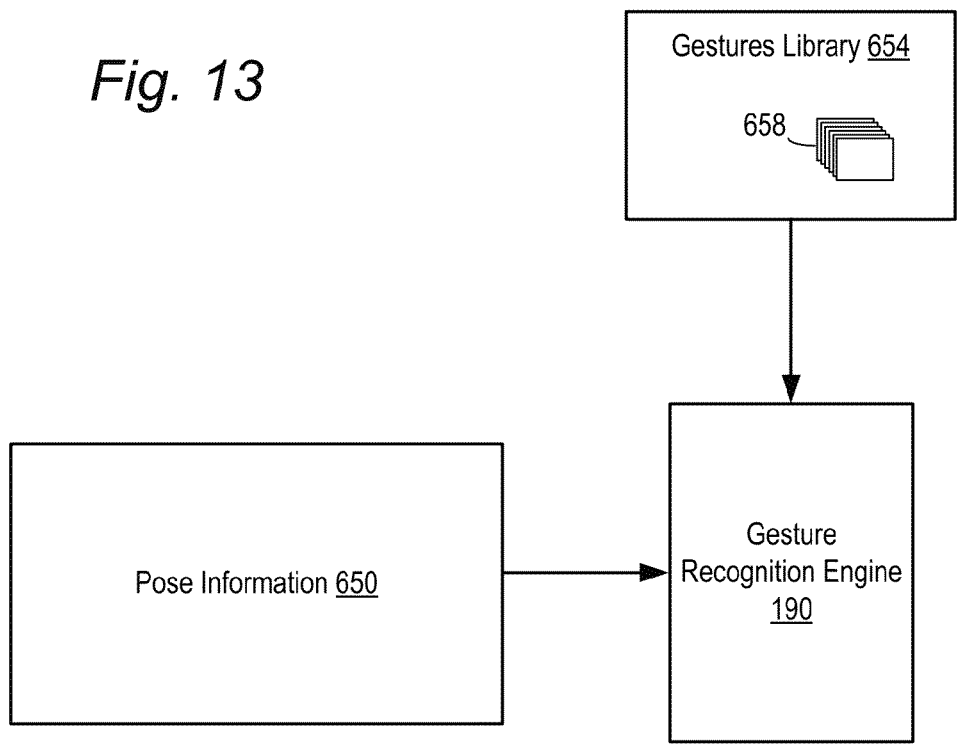
FIG. 13 is a block diagram showing a gesture recognition engine for recognizing gestures.
Figure 14:
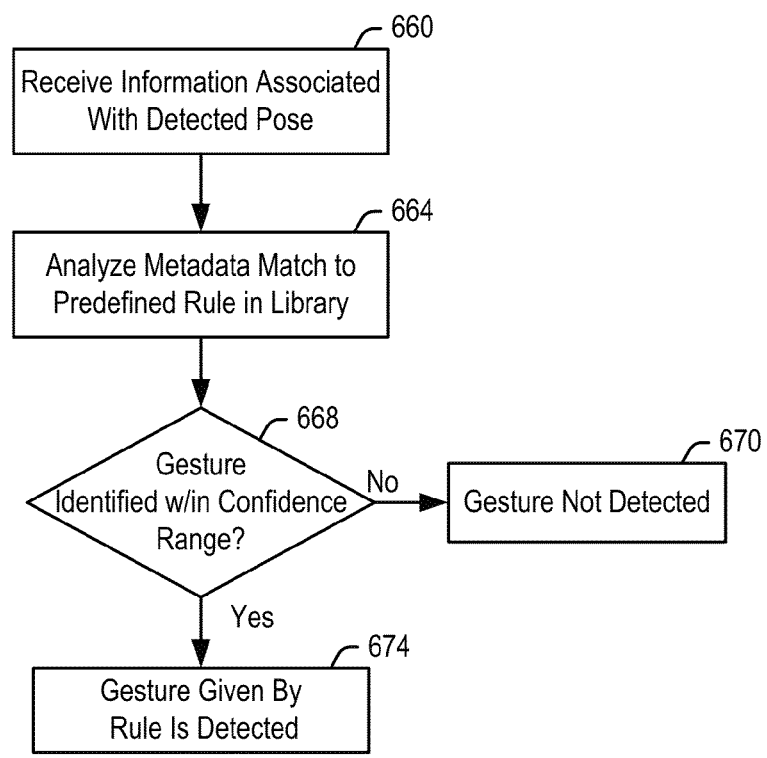
FIG. 14 is a flowchart of the operation of the gesture recognition engine of FIG. 13.

Many of the interactions described above are triggered by predefined gestures. FIG. 13 shows a block diagram of a gesture recognition engine 190, and FIG. 14 shows a block diagram of the operation of the gesture recognition engine 190 of FIG. 13. The gesture recognition engine 190 receives pose information 650 in step 660. The pose information may include a variety of parameters relating to position and/or motion of the user's body parts and joints as detected in the image data.

The gesture recognition engine 190 analyzes the received pose information 650 in step 664 to see if the pose information matches any predefined rule 658 stored within a gestures library 654. A stored rule 658 describes when particular positions and/or kinetic motions indicated by the pose information 650 are to be interpreted as a predefined gesture. In embodiments, each gesture may have a different, unique rule or set of rules 658. Each rule may have a number of parameters (joint position vectors, maximum/minimum position, change in position, etc.) for one or more of the body parts shown in FIG. 4. A stored rule may define, for each parameter and for each body part 302 through 330 shown in FIG. 4, a single value, a range of values, a maximum value, a minimum value or an indication that a parameter for that body part is not relevant to the determination of the gesture covered by the rule. Rules may be created by a game author, by a host of the gaming platform or by users themselves.

The gesture recognition engine 190 may output both an identified gesture and a confidence level which corresponds to the likelihood that the user's position/movement corresponds to that gesture. In particular, in addition to defining the parameters required for a gesture, a rule may further include a threshold confidence level required before pose information 650 is to be interpreted as a gesture. Some gestures may have more impact as system commands or gaming instructions, and as such, require a higher confidence level before a pose is interpreted as that gesture. The comparison of the pose information against the stored parameters for a rule results in a cumulative confidence level as to whether the pose information indicates a gesture.

Once a confidence level has been determined as to whether a given pose or motion satisfies a given gesture rule, the gesture recognition engine 190 then determines in step 668 whether the confidence level is above a predetermined threshold for the rule under consideration. The threshold confidence level may be stored in association with the rule under consideration. If the confidence level is below the threshold, no gesture is detected (step 670) and no action is taken. On the other hand, if the confidence level is above the threshold, the user's motion is determined to satisfy the gesture rule under consideration, and the gesture recognition engine 190 returns the identified gesture in step 674. The gesture recognition engine 190 may operate by other methods in further embodiments.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

What is claimed:

1. In a system comprising a computing environment coupled to a capture device for capturing user motion and an audiovisual device for displaying images and/or providing audio, a method of combining interactive gaming aspects into a linear story, comprising:
   a) presenting the linear story via the audiovisual device using at least one of images and an audio narrative, the linear story having a default story and an altered story, the default story including a default set of images and/or narrative that is presented to a user if a user does not interact with the story;
   b) detecting at least one of a movement or a voice command by a user via the capture device; and
   c) altering the linear story to the altered story where at least one of movement or voice command are detected in said step b), the linear story being altered in said step c) by presenting at least one of the additional images and additional narrative to a user via the audiovisual device.

2. The method of claim 1, wherein the linear story includes images having story scenes defined by three-dimensional descriptions of the scene in virtual machine space, said step c) of altering the linear story comprising the step d) of presenting additional images showing a scene from the default set of images from a different three dimensional viewing perspective within the virtual machine space.

3. The method of claim 2, the additional images presented in said step d) creating the impression of a user moving into the scene.

4. The method of claim 2, the additional images presented in said step d) creating the impression of a user examining an object from the scene more closely.

5. The method of claim 2, the additional images presented in said step d) creating the impression of a user examining an object from the scene from a different perspective.

6. The method of claim 2, the additional images presented in said step d) creating the impression of a user looking behind an object within the scene.

7. The method of claim 1, wherein said step c) of altering the linear story comprises the step e) of a user interacting with a character displayed within a scene.

8. The method of claim 1, wherein said step c) of altering the linear story occurs where it is determined that a movement and/or voice command is not an interaction that alters the linear story, but a predefined event occurs which alters the linear story, the predefined event relating to receiving the linear story a predetermined number of times without altering the story.

9. The method of claim 1, wherein the linear story includes an audio narrative and images, said step a) of presenting the linear story comprising the steps of:
   a1) a user voicing the narrative,
   a2) matching the user-voiced narrative to corresponding images of the linear story, and
   a3) presenting the images at a pace determined by a pace of the user-voiced narrative.

10. The method of claim 1, wherein the linear story includes an audio narrative and images presented to a user, said step a) of presenting the linear story comprising the steps of:
   a1) a third party voicing the narrative, the third party not present with the user and the third party's voice provided as the narrative via a speaker in a vicinity of the user,
   a2) matching the third party-voiced narrative to corresponding images of the linear story, and
   a3) presenting the images at a pace determined by a pace of the third party-voiced narrative.

11. A processor-readable storage medium for programming a processor to perform a method of combining interactive gaming aspects into a linear story, comprising:
   a) presenting the linear story via an audiovisual device using at least one of images and an audio narrative, the linear story presented as a complete story, beginning to end and including a default set of images, in the event no interaction by a user is perceived by a capture device monitoring user movements;
   b) detecting user interaction with the story by a user via a capture device to alter the linear story of the default set of images;
   c) altering the linear story to a story branch by presenting images in addition to or instead of the default set of images to a user via the audiovisual device if user interaction is received in said step (b) to alter the linear story of the default set of images; and
   d) scoring a user's interaction where the interaction corresponds to awarding or taking away a predetermined number of points based on how the user interacts with the story.

12. The processor-readable storage medium of claim 11, wherein the linear story includes images having story scenes defined by three-dimensional descriptions of the scene in virtual machine space, said step c) of altering the linear story comprising the step e) of presenting additional images showing a scene from the default set of images from a different three dimensional viewing perspective within the virtual machine space.

13. The processor-readable storage medium of claim 11, wherein said step b) comprises the step f) of a user taking over at least partial control of a character displayed as part of the linear story.

14. The processor-readable storage medium of claim 13, wherein said step f) comprises the step of a user controlling movement of a character displayed as part of the linear story in a monkey-see-monkey-do fashion, and/or a user controlling talking of the character.

15. The processor-readable storage medium of claim 11, wherein said steps a) and c) comprise the step of displaying the linear story and/or story branch in at least one of still-image panels, dynamic computer graphics animation and linear video.

16. A system for combining interactive gaming aspects into a linear story, comprising:
   an audiovisual device operable to present at least one of images and an audio narration;
   an image capture device operable to capture at least one of image and audio data from a user; and
   a computing environment coupled to the audiovisual device and image capture device, the computing environment operable to:
   a) present the linear story via the audiovisual device using at least one of images and an audio narrative, the linear story presented as a complete story, beginning to end and including a default set of images, in the event no interaction by a user is perceived by the capture device;
   b) detect an exploration gesture via the capture device;
   c) branch from the linear story to a story branch upon identifying the exploration gesture in said step b), the branch including:
      c1) sensing a point on the audiovisual device indicated by the user to be a desired viewing perspective, and
      c2) displaying the virtual object from the viewing perspective indicated in step c1).

17. The system of claim 16, the computing environment operable to sense the point on the audiovisual device indicated by the user by the capture device sensing a position of the user's head.

18. The system of claim 16, the computing environment operable to sense the point on the audiovisual device indicated by the user by the capture device sensing a point indicated by the user's hand.

19. The system of claim 16, the computing environment operable to branch back to the linear story when the user gestures that they are finished examining the virtual object.

20. The system of claim 16, wherein the user is able to augment a score associated with the user's experience in interacting with the linear and branched story.

* * * * *